US012085879B2

(12) United States Patent
Usami

(10) Patent No.: US 12,085,879 B2
(45) Date of Patent: Sep. 10, 2024

(54) CONTROL DEVICE AND IMAGE FORMING APPARATUS

(71) Applicant: Toshiba Tec Kabushiki Kaisha, Tokyo (JP)

(72) Inventor: Yutaka Usami, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/346,842

(22) Filed: Jul. 4, 2023

(65) Prior Publication Data

US 2024/0201622 A1 Jun. 20, 2024

(30) Foreign Application Priority Data

Dec. 20, 2022 (JP) ................................ 2022-203376

(51) Int. Cl.
*G03G 15/20* (2006.01)
*G03G 15/00* (2006.01)

(52) U.S. Cl.
CPC ....... *G03G 15/205* (2013.01); *G03G 15/2064* (2013.01); *G03G 15/5004* (2013.01); *G03G 15/5008* (2013.01); *G03G 2215/2045* (2013.01)

(58) Field of Classification Search
CPC ............. G03G 15/205; G03G 15/2039; G03G 15/2042; G03G 15/2046; G03G 15/5004; G03G 2215/2045
See application file for complete search history.

(56) References Cited

U.S. PATENT DOCUMENTS

2014/0270834 A1* 9/2014 Seshita .............. G03G 15/2042 399/68
2021/0364956 A1* 11/2021 Usami ................ G05D 23/1919
2021/0397115 A1 12/2021 Yabuki
2022/0187744 A1 6/2022 Usami
2023/0393508 A1* 12/2023 Iwasaki ............. G03G 15/5045

FOREIGN PATENT DOCUMENTS

JP 2017-072710 A 4/2017
JP 2022-034347 A 3/2022

* cited by examiner

*Primary Examiner* — Thomas S Giampaolo, II
(74) *Attorney, Agent, or Firm* — Kim & Stewart LLP

(57) ABSTRACT

A control device for controlling heat applied to a medium conveyed along a path, includes: first and second heaters arranged along a first direction crossing the path, the first heater overlapping the medium and the second heater not overlapping the medium when viewed in a direction crossing the path and the first direction; a sensor; and a circuit configured to determine estimated temperatures of the heaters based on power supplied thereto, determine a corrected temperature of the first heater based on the estimated temperature thereof and a temperature measured by the sensor, determine a corrected temperature of the second heater based on the estimated temperature thereof and the corrected and estimated temperatures of the first heater, energize the heaters based on the corrected temperatures, and issue a command for controlling a conveying speed based on the corrected temperature of the second heater.

20 Claims, 16 Drawing Sheets

CONTROL DEVICE AND IMAGE FORMING APPARATUS

CROSS-REFERENCE TO RELATED APPLICATION

This application is based upon and claims the benefit of priority from Japanese Patent Application No. 2022-203376, filed Dec. 20, 2022, the entire contents of which are incorporated herein by reference.

FIELD

Embodiments described herein relate generally to a control device and an image forming apparatus.

BACKGROUND

An image forming apparatus includes a fixing device that fixes a toner image on a print medium by applying heat and pressure to the print medium. The fixing device includes a fixing rotor (e.g., heat roller), a pressing member (e.g., pressing roller), a heating member (e.g., heater), and a temperature sensor. The temperature sensor detects the surface temperature of the heat roller.

The image forming apparatus performs control so that the surface temperature of the heat roller matches a target value by increasing or decreasing the amount of electric current supplied to the heater based on a detection signal or a temperature sensor signal output by the temperature sensor.

As an example, assume a case in which the image forming apparatus performs a print process on an A4 portrait sheet after performing a print process on a postcard. When the image forming apparatus performs the print process on the postcard, a portion of the heat roller facing the heater includes a portion facing the postcard and a portion not facing the postcard. Because a temperature sensor is expensive, it is difficult to provide many temperature sensors in the image forming apparatus. Accordingly, although the image forming apparatus can detect the surface temperature of the portion facing the postcard where the temperature sensor is disposed, the image forming apparatus cannot detect the surface temperature of the portion not facing the postcard where the temperature sensor is not disposed. Heat of the portion facing the postcard is removed by the postcard and is also controlled by the image forming apparatus to match the target temperature. On the other hand, heat of the portion not facing the postcard is not removed by the postcard and is accumulated, and therefore, the temperature of the portion not facing the postcard becomes higher than the temperature of the portion facing the postcard.

Because the width of the A4 portrait sheet is greater than the width of the postcard, the portion not facing the postcard faces the A4 portrait sheet. If the temperature of the portion not facing the postcard becomes excessively high, a portion of the A4 portrait sheet is heated at a temperature higher than the target temperature. This adversely affects the fixing of a toner image on the A4 portrait sheet. Here, when the image forming apparatus performs low-speed printing on the postcard, the surface temperature of the portion not facing the postcard decreases over time. Accordingly, the image forming apparatus can prevent the temperature of the portion not facing the postcard from becoming excessively high by performing low-speed printing.

However, as described above, the image forming apparatus cannot detect the surface temperature of the portion not facing the postcard. Because the image forming apparatus cannot determine the timing to adjust the print speed based on the surface temperature of the portion not facing the postcard, the image forming apparatus needs to perform low-speed printing from the start. Therefore, the time taken by the image forming apparatus to perform a print process on the postcard increases.

SUMMARY OF THE INVENTION

An aspect of this disclosure makes it possible to provide a temperature control device and an image forming apparatus capable of reducing processing time.

Embodiments of the present invention provide a control device for controlling heat to be applied to a medium conveyed along a conveyance path, comprising: a plurality of heaters arranged along a first direction crossing the conveyance path, wherein the heaters include first and second heaters, wherein when the medium is conveyed, the first heater overlaps the medium and the second heater does not overlap the medium when viewed in a second direction crossing the conveyance path and the first direction; a temperature sensor; and a control circuit configured to: determine an estimated temperature of each of the first and second heaters based on an amount of power supplied to said each of the first and second heaters, determine a corrected temperature of the first heater based on the estimated temperature of the first heater and a temperature measured by the temperature sensor, determine a corrected temperature of the second heater based on the estimated temperature of the second heater, the corrected temperature of the first heater, and the estimated temperature of the first heater, generate energizing pulses for energizing the first and second heaters based on the corrected temperatures of the first and second heaters, and issue a command for controlling a conveying speed of the medium based on the corrected temperature of the second heater.

DETAILED DESCRIPTION

Hereinafter, embodiments will be described in detail with reference to the drawings. The present invention is not limited to the embodiments described below.

Figure 1:
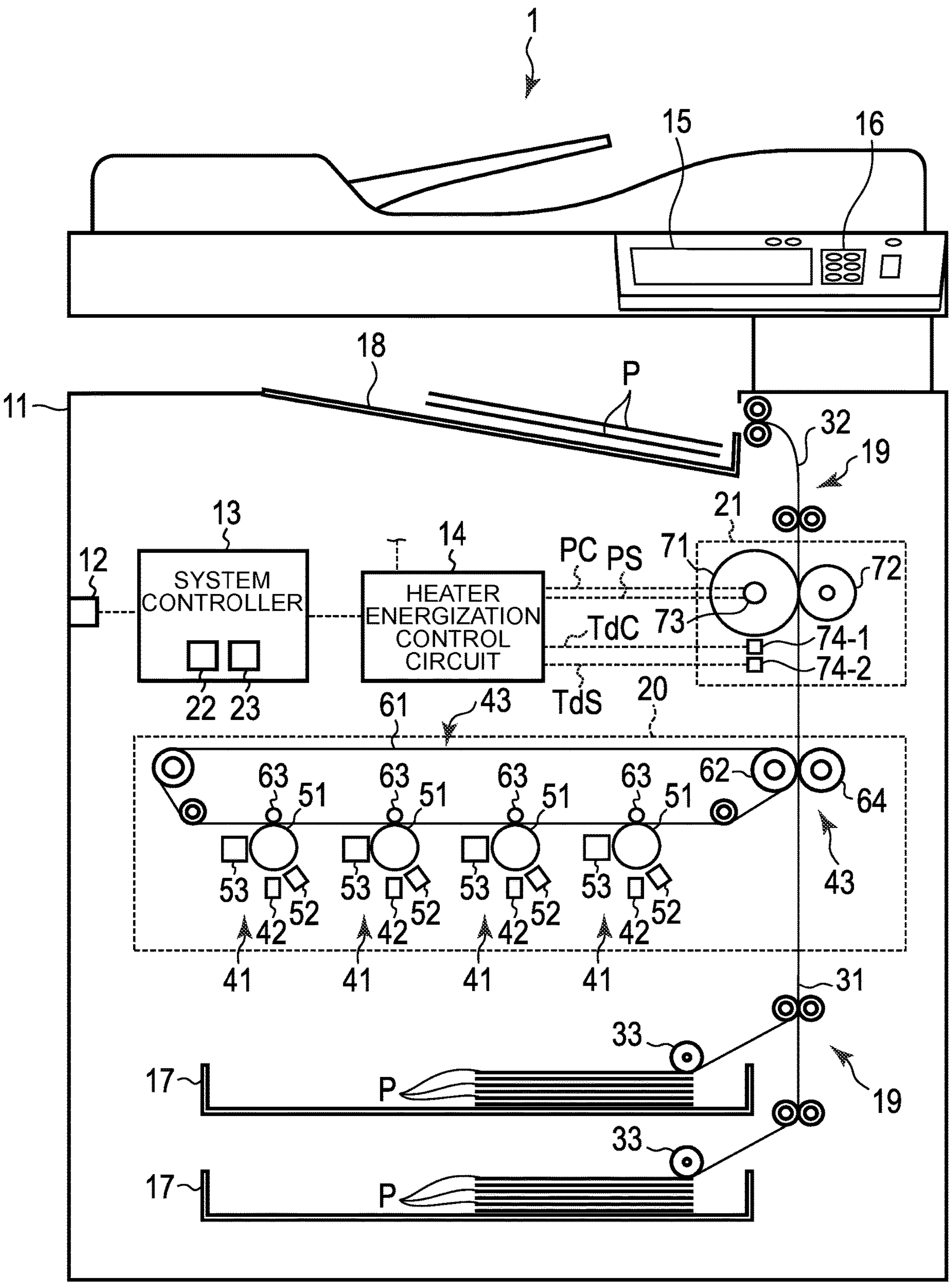
FIG. 1 is a diagram illustrating a configuration of an image forming apparatus according to an embodiment.

An image forming apparatus 1 is described as an example of a temperature control device with reference to the drawings. FIG. 1 is a diagram illustrating an example of a configuration of the image forming apparatus 1 according to an embodiment.

The image forming apparatus 1 is, for example, a multifunction peripheral (MFP) that performs various processes, such as image formation, while conveying a print medium P. As another example, the image forming apparatus 1 is a solid-state scanning printer (e.g., a light emitting diode (LED) printer) that drives an LED array to perform various processes, such as image formation, while conveying the print medium P. The print medium P may be any medium on which printing can be performed. Examples of print media P include a sheet, such as a paper sheet, a postcard, and an envelope.

For example, the image forming apparatus 1 is configured to form an image on the print medium P with toner stored in a toner cartridge. The toner may be a monochrome toner or a color toner with a color such as cyan, magenta, yellow, or black. Also, the toner may be a decolorable toner that is decolored when heat is applied.

As illustrated in FIG. 1, the image forming apparatus 1 includes a housing 11, a communication interface 12, a system controller 13, a heater energization control circuit 14, a display unit 15, an operation interface 16, multiple sheet trays 17, a sheet discharge tray 18, a conveyance unit 19, an image forming unit 20, and a fixing device 21.

The housing 11 is a main body of the image forming apparatus 1. The housing 11 houses the communication interface 12, the system controller 13, the heater energization control circuit 14, the sheet trays 17, the conveyance unit 19, the image forming unit 20, and the fixing device 21. The display unit 15, the operation interface 16, and the sheet discharge tray 18 are provided on the housing 11.

First, a configuration of a control system of the image forming apparatus 1 is described.

The communication interface 12 is for communication with other devices. For example, the communication interface 12 is used for communication with a higher-level device or an external device such as a personal computer. The communication interface 12 is implemented by, for example, a local area network (LAN) controller. The communication interface 12 may also be configured to wirelessly communicate with other devices in accordance with a standard such as Bluetooth® or Wi-Fi®.

The system controller 13 controls the image forming apparatus 1. The system controller 13 includes, for example, a processor 22 and a memory 23.

The processor 22 is an arithmetic element that performs arithmetic processing. The processor 22 is, for example, a central processing unit (CPU). The processor 22 performs various processes by executing programs stored in the memory 23. The processor 22 functions as a control unit that can perform various operations by executing programs stored in the memory 23. The processor 22 may be a dedicated processing circuit.

The processor 22 performs various types of information processing by executing programs stored in the memory 23. For example, the processor 22 generates a print job based on an image acquired from an external device via the communication interface 12. The processor 22 stores the generated print job in the memory 23.

A print job includes image data representing an image to be formed on the print medium P. Image data may represent one or more images to be formed on one print medium P or may represent images to be formed on multiple print media P. A print job also includes information indicating either color printing or monochrome printing. Furthermore, a print job may include information such as the number of copies or the number of page sets and the number of pages per copy.

Based on the generated print job, the processor 22 also generates print control information for controlling the operations of the conveyance unit 19, the image forming unit 20, and the fixing device 21. The print control information includes information indicating sheet feed timing. The processor 22 supplies the print control information to the heater energization control circuit 14.

The processor 22 also functions as a controller that controls the operations of the conveyance unit 19 and the image forming unit 20 by executing programs stored in the memory 23. That is, the processor 22 controls, for example, the conveyance of the print medium P by the conveyance unit 19 and the image formation on the print medium P by the image forming unit 20.

The memory 23 stores programs and data used by the processor 22. The memory 23 also functions as a working memory that temporarily stores data being processed by the processor 22 and programs being executed by the processor 22. For example, the memory 23 includes a random-access memory (RAM).

The image forming apparatus 1 may include an engine controller separately from the system controller 13. In this case, the engine controller controls the conveyance of the print medium P by the conveyance unit 19 and the image formation on the print medium P by the image forming unit 20. Also, in this case, the system controller 13 supplies the engine controller with information necessary for the engine controller to perform control.

The image forming apparatus 1 also includes a power conversion circuit (not shown) that supplies direct-current voltages to various components of the image forming apparatus 1 by using an alternating-current (AC) voltage supplied from an AC power supply. The power conversion circuit supplies direct-current (DC) voltages necessary for the operations of the processor 22 and the memory 23 to the system controller 13. Also, the power conversion circuit supplies a direct-current voltage necessary for image formation to the image forming unit 20. Also, the power conversion circuit supplies a direct-current voltage necessary for conveying the print medium P to the conveyance unit 19. Furthermore, the power conversion circuit supplies a direct-current voltage for driving a heater 73 of the fixing device 21 to the heater energization control circuit 14.

The heater energization control circuit 14 separately controls the energization of a center heater 73-1 and two side heaters 73-2 included in the heater 73 of the fixing device 21. The heater energization control circuit 14 generates energizing power PC for energizing the center heater 73-1 and supplies the energizing power PC to the center heater 73-1. Also, the heater energization control circuit 14 generates energizing power PS for energizing the two side heaters 73-2 and supplies the energizing power PS to the two side heaters 73-2. The heater energization control circuit 14 is described later in more detail.

The display unit 15 includes a display that displays a screen according to a video signal input from the system controller 13 or a display control unit, such as a graphics controller (not shown). For example, the display unit 15 displays a screen for various settings of the image forming apparatus 1.

The operation interface 16 includes an input device. The operation interface 16 supplies an operation signal corresponding to an operation made through the input device to the system controller 13. The operation member is, for example, a touch sensor, a numeric keypad, a power key, a sheet feed key, various function keys, or a keyboard. The touch sensor acquires information indicating a position specified in a given area. The touch sensor is integrated with the display unit 15 to form a touch panel and inputs, to the system controller 13, a signal indicating a position touched on a screen displayed on the display unit 15.

Each of the multiple sheet trays 17 is a cassette for storing the print media P. Each sheet tray 17 is configured such that the print media P can be supplied from the outside of the housing 11. For example, the sheet tray 17 is configured to be extractable from the housing 11.

The sheet discharge tray 18 supports the print medium P discharged from the image forming apparatus 1.

Next, a configuration of the image forming apparatus 1 for conveying the print medium P is described.

The conveyance unit 19 is a mechanism for conveying the print medium P in the image forming apparatus 1. As illustrated in FIG. 1, the conveyance unit 19 includes multiple conveyance paths. For example, the conveyance unit 19 includes a sheet feeding path 31 and a sheet discharging path 32.

Each of the sheet feeding path 31 and the sheet discharging path 32 includes multiple motors (not shown), multiple rollers, and multiple guides. Each of the multiple motors rotates a shaft under the control of the system controller 13 and thereby rotates a roller that rotates along with the rotation of the shaft. When rotated, the multiple rollers convey the print medium P. The multiple guides control the direction in which the print medium P is conveyed.

The print medium P is picked up from the sheet tray 17 and supplied to the image forming unit 20 through the sheet feeding path 31. A pickup roller 33 is disposed on the sheet feeding path 31 for each sheet tray. The pickup roller 33 picks up the print medium P from the corresponding sheet tray 17 and feeds the print medium P to the sheet feeding path 31.

The sheet discharging path 32 is used to discharge, from the housing 11, the print medium P on which an image has been formed. The print medium P discharged through the sheet discharging path 32 is supported by the sheet discharge tray 18.

Next, the image forming unit 20 is described.

The image forming unit 20 is configured to form an image on the print medium P. Specifically, the image forming unit 20 forms an image on the print medium P based on a print job generated by the processor 22.

The image forming unit 20 includes multiple process units 41, multiple exposure units 42, and a transfer mechanism 43. The image forming unit 20 includes an exposure unit 42 for each process unit 41. Because the multiple process units 41 have the same configuration and the multiple exposure units 42 have the same configuration, only one process unit 41 and one exposure unit 42 are described here.

First, the process unit 41 is described.

The process unit 41 is configured to form a toner image. For example, the multiple process units 41 are provided for different types of toner. For example, the multiple process units 41 correspond to color toners such as cyan, magenta, yellow, and black toners. Specifically, toner cartridges containing toners of different colors are connected to the process units 41.

Each toner cartridge includes a toner container and a toner feeding mechanism. The toner container contains a toner. The toner feeding mechanism is implemented by, for example, a screw that feeds the toner in the toner container.

The process unit 41 includes a photosensitive drum 51, an electrostatic charger 52, and a developing device 53.

The photosensitive drum 51 is a photoreceptor including a cylindrical drum and a photosensitive layer formed on the outer peripheral surface of the drum. The photosensitive drum 51 is rotated at a constant speed by a drive mechanism (not shown).

The electrostatic charger 52 uniformly charges the surface of the photosensitive drum 51. For example, the electrostatic charger 52 uses a charging roller to apply a voltage (i.e., development bias voltage) to the photosensitive drum 51 and thereby charges the photosensitive drum 51 to a uniform negative potential (i.e., contrast potential). The charging roller is pressed against the photosensitive drum 51 with a certain pressure and rotates along with the rotation of the photosensitive drum 51.

The developing device 53 causes toner to adhere to the photosensitive drum 51. The developing device 53 includes, for example, a developer container, a stirring mechanism, a developing roller, a doctor blade, and an automatic toner control (ATC) sensor.

The developer container receives and stores toner that is fed from the toner cartridge. A career is stored in advance in the developer container. The toner fed from the toner cartridge is stirred together with the career by the stirring mechanism to form a developer in which the toner and the career are mixed. The career is stored in the developer container when the developing device 53 is manufactured.

The developing roller rotates in the developer container so that the developer adheres to the surface of the developing roller. The doctor blade is disposed at a predetermined distance from the surface of the developing roller. The doctor blade removes a portion of the developer adhering to the surface of the rotating developing roller. As a result, on the surface of the developing roller, a layer of the developer with a thickness corresponding to the distance between the doctor blade and the surface of the developing roller is formed.

The ATC sensor is, for example, a magnetic flux sensor that includes a coil and detects a voltage applied to the coil. The voltage detected by the ATC sensor varies depending on the density of the magnetic flux from the toner in the developer container. That is, based on the voltage detected by the ATC sensor, the system controller 13 determines the concentration ratio (hereinafter referred to as the toner concentration ratio) of the toner remaining in the developer container to the career. Based on the toner concentration ratio, the system controller 13 drives a motor (not shown) for driving the feed mechanism of the toner cartridge and thereby sends the toner from the toner cartridge to the developer container of the developing device 53.

Next, the exposure unit 42 is described.

The exposure unit 42 includes multiple light-emitting elements. The exposure unit 42 irradiates the charged photosensitive drum 51 with light emitted from the light-emitting elements and thereby forms a latent image on the photosensitive drum 51. Each of the light-emitting elements is, for example, an LED. One light-emitting element is configured to irradiate one point on the photosensitive drum 51. The multiple light-emitting elements are arranged in a main-scanning direction that is parallel to the rotational axis of the photosensitive drum 51.

The exposure unit 42 irradiates the photosensitive drum 51 with the multiple light-emitting elements arranged in the main-scanning direction to form one line of a latent image on the photosensitive drum 51. Furthermore, the exposure unit 42 consecutively irradiates the rotating photosensitive drum 51 to form multiple lines of a latent image.

With the above configuration, when the surface of the photosensitive drum 51 charged by the electrostatic charger 52 is irradiated by the exposure unit 42, an electrostatic latent image is formed. When the layer of the developer formed on the surface of the developing roller is placed close to the surface of the photosensitive drum 51, the toner contained in the developer adheres to the latent image formed on the surface of the photosensitive drum 51. As a result, a toner image is formed on the surface of the photosensitive drum 51.

Next, the transfer mechanism 43 is described.

The transfer mechanism 43 is configured to transfer the toner image formed on the surface of the photosensitive drum 51 to the print medium P.

The transfer mechanism 43 includes, for example, a primary transfer belt 61, a secondary transfer facing roller 62, multiple primary transfer rollers 63, and a secondary transfer roller 64.

The primary transfer belt 61 is an endless belt wound around the secondary transfer facing roller 62 and multiple winding rollers. The primary transfer belt 61 has an inner peripheral surface that contacts the secondary transfer facing roller 62 and the multiple winding rollers and an outer peripheral surface that faces the photosensitive drums 51 of the process units 41.

The secondary transfer facing roller 62 is rotated by a motor (not shown). The secondary transfer facing roller 62 is rotated to convey the primary transfer belt 61 in a predetermined conveying direction. The multiple winding rollers are configured to be freely rotatable. The multiple winding rollers rotate along with the movement of the primary transfer belt 61 caused by the secondary transfer facing roller 62.

The multiple primary transfer rollers 63 are configured to bring the primary transfer belt 61 into contact with the photosensitive drums 51 of the process units 41. The multiple primary transfer rollers 63 are disposed to face the corresponding photosensitive drums 51 of the multiple process units 41. Specifically, the multiple primary transfer rollers 63 are disposed to face the corresponding photosensitive drums 51 of the process units 41 across the primary transfer belt 61. Each primary transfer roller 63 contacts the inner peripheral surface of the primary transfer belt 61 and displaces the primary transfer belt 61 toward the photosensitive drum 51. Accordingly, the primary transfer roller 63 causes the outer peripheral surface of the primary transfer belt 61 to contact the photosensitive drum 51.

The secondary transfer roller 64 is disposed to face the primary transfer belt 61. The secondary transfer roller 64 contacts the outer peripheral surface of the primary transfer belt 61 and applies a pressure to the primary transfer belt 61. With this configuration, a transfer nip is formed between the secondary transfer roller 64 and the outer peripheral surface of the primary transfer belt 61 that are in close contact with each other. When the print medium P passes through the transfer nip, the secondary transfer roller 64 presses the print medium P passing through the transfer nip against the outer peripheral surface of the primary transfer belt 61.

The secondary transfer roller 64 and the secondary transfer facing roller 62 rotate to convey the print medium P that is supplied from the sheet feeding path 31 and sandwiched between the secondary transfer roller 64 and the secondary transfer facing roller 62. As a result, the print medium P passes through the transfer nip.

With the above configuration, when the outer peripheral surface of the primary transfer belt 61 contacts the photosensitive drum 51, the toner image formed on the surface of the photosensitive drum 51 is transferred to the outer peripheral surface of the primary transfer belt 61. When the image forming unit 20 includes multiple process units 41, the primary transfer belt 61 receives toner images from the photosensitive drums 51 of the multiple process units 41. The toner images transferred to the outer peripheral surface of the primary transfer belt 61 are conveyed by the primary transfer belt 61 to the transfer nip at which the secondary transfer roller 64 and the outer peripheral surface of the primary transfer belt 61 are in close contact with each other. When the print medium P is present in the transfer nip, the toner images transferred to the outer peripheral surface of the primary transfer belt 61 are transferred to the print medium P at the transfer nip.

Next, a configuration of the image forming apparatus 1 for fixing a toner image is described.

The fixing device 21 fixes a toner image on the print medium P to which the toner image has been transferred. The fixing device 21 operates under the control of the system controller 13 and the heater energization control circuit 14. The fixing device 21 includes a fixing rotor, a pressing member, and a heating member. The fixing rotor is, for example, a heat roller 71. The heat roller 71 heats the toner image formed on the print medium P and thereby fixes the toner image on the print medium P. The pressing member is, for example, a press roller 72. The heating member is, for example, a heater 73 that heats the heat roller 71. As described later, the heater 73 includes a center heater 73-1 and two side heaters 73-2. The fixing device 21 further includes a temperature sensor 74-1 and a temperature sensor 74-2 that detect the temperatures of the heat roller 71. The positional relationship among the heat roller 71, the heater 73, the temperature sensor 74-1, and the temperature sensor 74-2 is described later.

The heat roller 71 is a fixing rotor that is rotated by a motor (not shown). The heat roller 71 includes a hollow core bar formed of metal and an elastic layer formed on the outer peripheral surface of the core bar. The inside of the hollow core bar of the heat roller 71 is heated by the heater 73 disposed inside of the core bar. The heat generated inside of the core bar is transferred to the outer surface of the heat roller 71 (i.e., the surface of the elastic layer).

The press roller 72 is disposed to face the heat roller 71. The press roller 72 includes a core bar formed of metal and having a predetermined outer diameter and an elastic layer formed on the outer peripheral surface of the core bar. The press roller 72 applies, to the heat roller 71, a pressure that is applied by a tension member (not shown). When the pressure is applied from the press roller 72 to the heat roller 71, a nip (hereinafter referred to as a fixing nip) is formed between the press roller 72 and the heat roller 71 that are in close contact with each other. The press roller 72 is rotated by a motor (not shown). When rotated, the press roller 72 conveys the print medium P entering the fixing nip and presses the print medium P against the heat roller 71.

The heater 73 generates heat when energizing power is supplied from the heater energization control circuit 14. For example, the center heater 73-1 generates heat using energizing power PC supplied from the heater energization control circuit 14. The two side heaters 73-2 generate heat using energizing power PS supplied from the heater energization control circuit 14. The heater 73 is, for example, a halogen lamp heater. When energizing power is supplied from the heater energization control circuit 14 to the halogen lamp heater, which is a heat source of the heater 73, the inside of the core bar of the heat roller 71 is heated by electromagnetic waves emitted from the halogen lamp heater. The heater 73 may also be, for example, an induction heater.

Each of the temperature sensor 74-1 and the temperature sensor 74-2 detects the temperature of the heat roller 71. Here, it is assumed that each of the temperature sensor 74-1 and the temperature sensor 74-2 detects the surface temperature of the heat roller 71. The temperature sensor 74-1 and the temperature sensor 74-2 may be configured to detect the temperature of air near the surface of the heat roller 71. The temperature sensor 74-1 and the temperature sensor 74-2 may be provided at any locations as long as the temperature sensor 74-1 and the temperature sensor 74-2 can detect changes in the surface temperature of the heat roller 71.

The temperature sensor 74-1 supplies a temperature detection result TdC, which indicates the temperature of the heat roller 71 detected by the temperature sensor 74-1, to the heater energization control circuit 14. The temperature detection result TdC is a surface temperature of the heat roller 71 detected by the temperature sensor 74-1. The temperature detection result TdC may also refer to a signal indicating a surface temperature of the heat roller 71 detected by the temperature sensor 74-1.

The temperature sensor 74-2 supplies a temperature detection result TdS, which indicates the temperature of the heat roller 71 detected by the temperature sensor 74-2, to the heater energization control circuit 14. The temperature detection result TdS is a surface temperature of the heat roller 71 detected by the temperature sensor 74-2. The temperature detection result TdS may also refer to a signal indicating a surface temperature of the heat roller 71 detected by the temperature sensor 74-2.

With the above configuration, the heat roller 71 and the press roller 72 apply heat and pressure to the print medium P passing through the fixing nip. The toner on the print medium P is melted by the heat applied by the heat roller 71 and is applied to the surface of the print medium P by the pressure applied by the heat roller 71 and the press roller 72. As a result, the toner image is fixed to the print medium P passing through the fixing nip. The print medium P that has passed through the fixing nip is introduced into the sheet discharging path 32 and is then discharged to the sheet discharge tray 18.

Next, a positional relationship among the heat roller 71, the heater 73, the temperature sensor 74-1, and the temperature sensor 74-2 are described.

Figure 2:
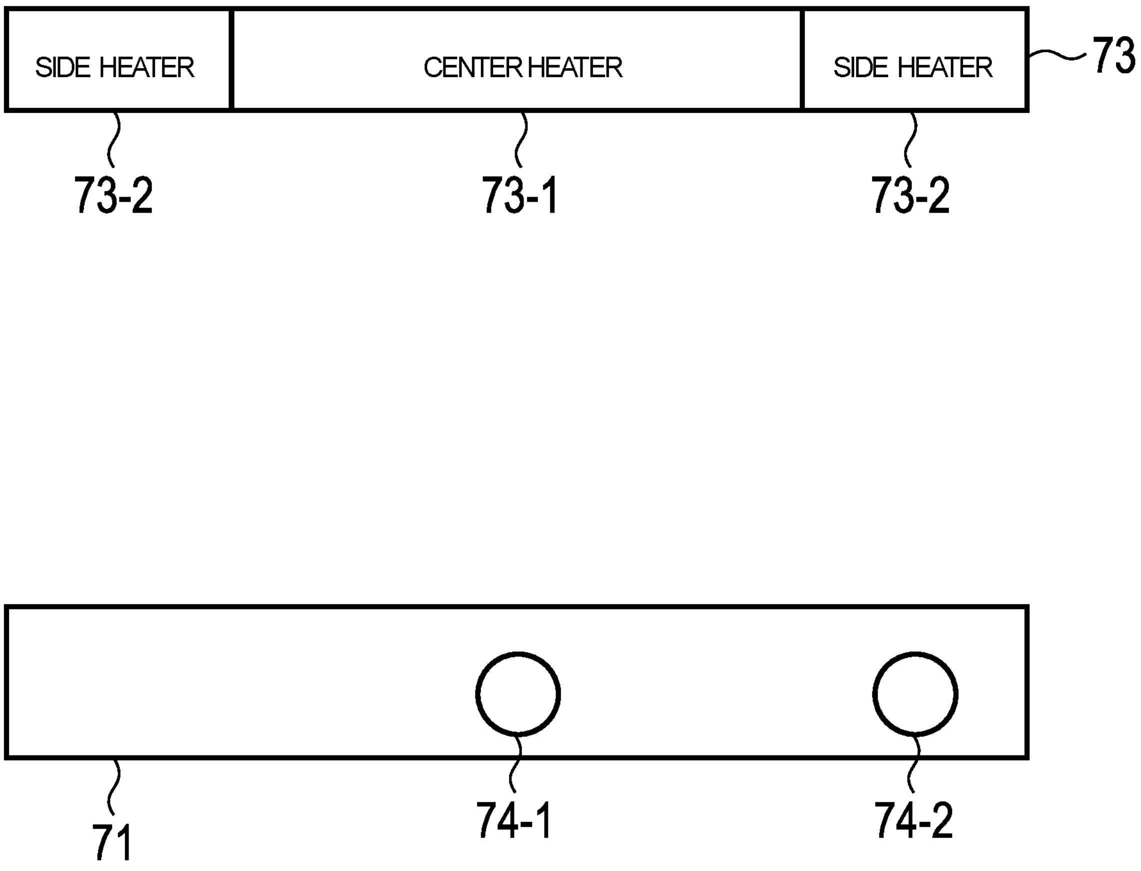
FIG. 2 is a diagram illustrating a positional relationship among a heat roller, a heater, and multiple temperature sensors according to an embodiment.

FIG. 2 illustrates an example of a positional relationship among the heat roller 71, the heater 73, the temperature sensor 74-1, and the temperature sensor 74-2.

The longitudinal direction of the heat roller 71 is parallel to a direction that is orthogonal to the conveying direction of the print medium P. In one embodiment, the size of the heat roller 71 in the longitudinal direction is greater than the width of an A3 portrait sheet. In such a case, the A3 portrait sheet has the largest width among print media P supported by the image forming apparatus 1. The size of the heat roller 71 is not limited to the one described above.

The heater 73 is disposed parallel to the longitudinal direction of the heat roller 71. The size of the heater 73 in the longitudinal direction is substantially the same as the size of the heat roller 71 in the longitudinal direction. One end of the heater 73 in the longitudinal direction is disposed substantially at the same position as one end of the heat roller 71 in the longitudinal direction. The other end of the heater 73 in the longitudinal direction is disposed at substantially the same position as the other end of the heat roller 71 in the longitudinal direction.

The heater 73 includes the center heater 73-1 and two side heaters 73-2 disposed on the corresponding sides of the center heater 73-2. In one embodiment, the size of the center heater 73-1 in the longitudinal direction is less than the width of the A3 portrait sheet and greater than the width of the A4 portrait sheet. The center heater 73-1 heats a portion of the heat roller 71 facing the center heater 73-1. For example, the portion of the heat roller 71 facing the center heater 73-1 is a portion in the longitudinal direction of the heat roller 71 that faces the center heater 73-1. Specifically, the portion of the heat roller 71 facing the center heater 73-1 is a central portion of the heat roller 71 in the longitudinal direction. In other words, the portion of the heat roller 71 facing the center heater 73-1 is a portion of the heat roller 71 to which heat is transferred from the center heater 73-1. The side heaters 73-2 heat portions of the heat roller 71 facing the side heaters 73-2. For example, the portions of the heat roller 71 facing the side heaters 73-2 are portions in the longitudinal direction of the heat roller 71 that face the side heaters 73-2. Specifically, the portions of the heat roller 71 facing the side heaters 73-2 are end portions in the longitudinal direction of the heat roller 71. In other words, the portions of the heat roller 71 facing the side heaters 73-2 are portions of the heat roller 71 to which heat is transferred from the side heaters 73-2.

The temperature sensor 74-1 detects the surface temperature at a first position on the heat roller 71. The first position is in a portion of the heat roller 71 that faces the center heater 73-1 and also faces the print medium P regardless of the width of the print medium P. For example, the portion of the heat roller 71 facing the print medium P is a portion in the longitudinal direction of the heat roller 71 that faces the print medium P. For example, the first position is the center position in the longitudinal direction of the heat roller 71. Therefore, the temperature detection result TdC is a surface temperature, which is detected by temperature sensor 74-1, of the portion of the heat roller 71 facing the print medium P.

The temperature sensor 74-2 detects the surface temperature at a second position on the heat roller 71. The second position is in a portion of the heat roller 71 that faces one of the side heaters 73-2 and also faces the A3 portrait sheet. Accordingly, the temperature detection result TdS indicates a surface temperature, which is detected by the temperature sensor 74-2, of a portion of the heat roller 71 facing the A3 portrait sheet.

Here, the heater energization control circuit 14 may similarly control the energization of the two side heaters 73-2 based on the temperature detection result TdS from the temperature sensor 74-2. Therefore, the fixing device 21 needs to include only one temperature sensor 74-2 that detects the surface temperature of a portion of the heat roller 71 facing either one of the two side heaters 73-2.

Next, temperature distributions of the heat roller 71 depending on the types of the print medium P are described.

Here, it is assumed that the print medium P is an A3 portrait sheet.

Figure 3:
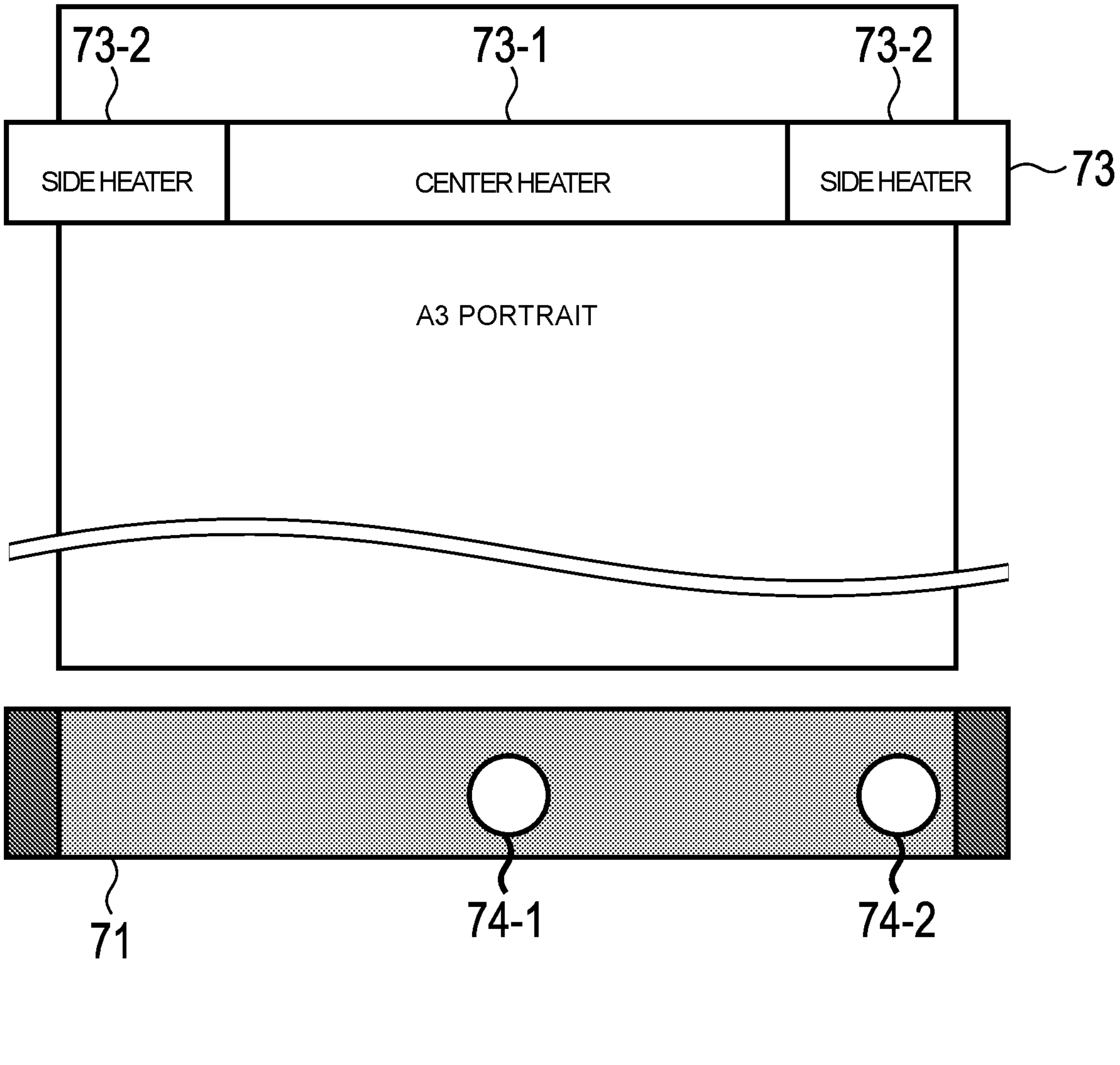
FIG. 3 is a diagram illustrating a temperature distribution of the heat roller observed when an A3 portrait sheet is conveyed according to an embodiment.

FIG. 3 is a diagram illustrating an example of a temperature distribution of the heat roller 71 observed when an A3 portrait sheet is conveyed.

The width of the A3 portrait sheet is greater than the size of the center heater 73-1 in the longitudinal direction. Accordingly, the A3 portrait sheet faces the entire portion of the heat roller 71 facing the center heater 73-1. The A3 portrait sheet also faces parts of portions of the heat roller 71 facing the two side heaters 73-2. The heater energization control circuit 14 supplies the energizing power PC to the center heater 73-1. The center heater 73-1 generates heat using the energizing power PC and heats the portion of the heat roller 71 facing the center heater 73-1. The heater energization control circuit 14 supplies the energizing power PS to the two side heaters 73-2. The two side heaters 73-2 generate heat using the energizing power PS and thereby heat the portions of the heat roller 71 facing the two side heaters 73-2.

The portion of the heat roller 71 facing the center heater 73-1 is a portion that is heated and faces the A3 portrait sheet. Each of the portions of the heat roller 71 facing the two side heaters 73-2 includes a portion that is heated and faces the A3 portrait sheet and a portion that is heated and does not face the A3 portrait sheet. The portions that are heated and face the A3 portrait sheet are indicated in light gray. The portions being heated and not facing the A3 portrait sheet are indicated in dark gray. The temperature of the portions being heated and facing the A3 portrait sheet is controlled by the heater energization control circuit 14 to match a target temperature. The temperature of the portions being heated and not facing the A3 portrait sheet is higher than the target temperature because heat is not removed by the A3 portrait sheet and is accumulated. Because the width of the A4 landscape sheet is the same as the width of the A3 portrait sheet, the above example of the temperature distribution of the heat roller 71 observed when the A3 portrait sheet is conveyed also applies to the temperature distribution of the heat roller 71 observed when the A4 landscape sheet is conveyed.

Next, a case where the print medium P is the A4 portrait sheet is described.

Figure 4:
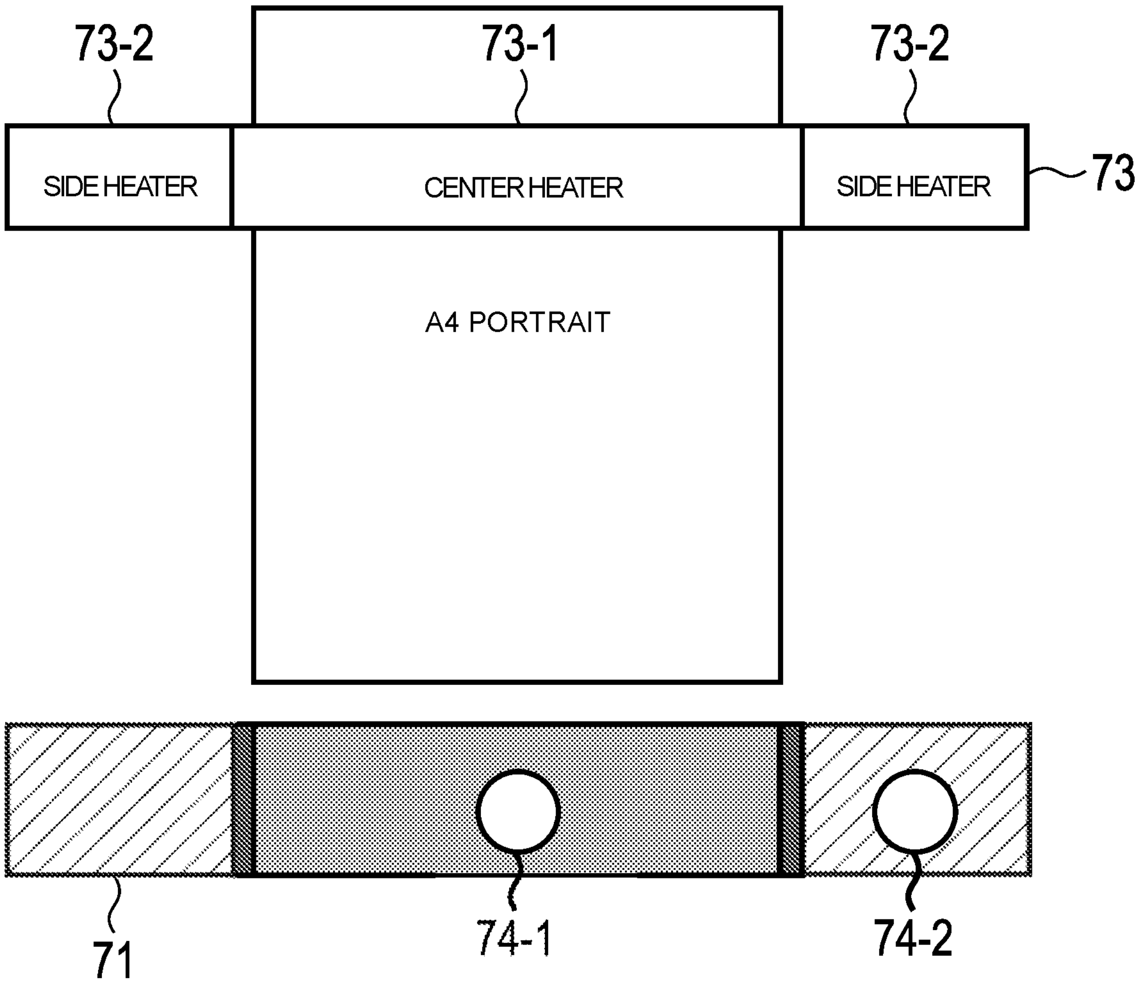
FIG. 4 is a diagram illustrating a temperature distribution of the heat roller observed when an A4 portrait sheet is conveyed according to an embodiment.

FIG. 4 illustrates an example of a temperature distribution of the heat roller 71 observed when the A4 portrait sheet is conveyed.

The width of the A4 portrait sheet is less than the size of the center heater 73-1 in the longitudinal direction. Therefore, the A4 portrait sheet faces a part of a portion of the heat roller 71 that faces the center heater 73-1. The A4 portrait sheet faces none of the portions of the heat roller 71 that face the two side heaters 73-2. The heater energization control circuit 14 supplies the energizing power PC to the center heater 73-1. The center heater 73-1 generates heat using the energizing power PC and thereby heats the portion of the heat roller 71 facing the center heater 73-1. The heater energization control circuit 14 does not supply the energizing power PS to the two side heaters 73-2. The two side heaters 73-2 do not heat the portions of the heat roller 71 that face the two side heaters 73-2.

The portion of the heat roller 71 facing the center heater 73-1 includes a portion that is heated and faces the A4 portrait sheet and portions that are heated and do not face the A4 portrait sheet. The portions of the heat roller 71 facing the two side heaters 73-2 are not heated and do not face the A4 portrait sheet. The portion being heated and facing the A4 portrait sheet is indicated in light gray. The portions being heated and not facing the A4 portrait sheet are indicated in dark gray. The portions not being heated and not facing the A4 portrait sheet are indicated by hatching. The temperature of the portion being heated and facing the A4 portrait sheet is controlled by the heater energization control circuit 14 to match a target temperature. The temperature of the portions being heated and not facing the A4 portrait sheet is higher than the target temperature because heat is not removed by the A4 portrait sheet and is accumulated. The portions not being heated and not facing the A4 portrait sheet are at the room temperature.

Next, a case where the print medium P is a postcard is described.

Figure 5:
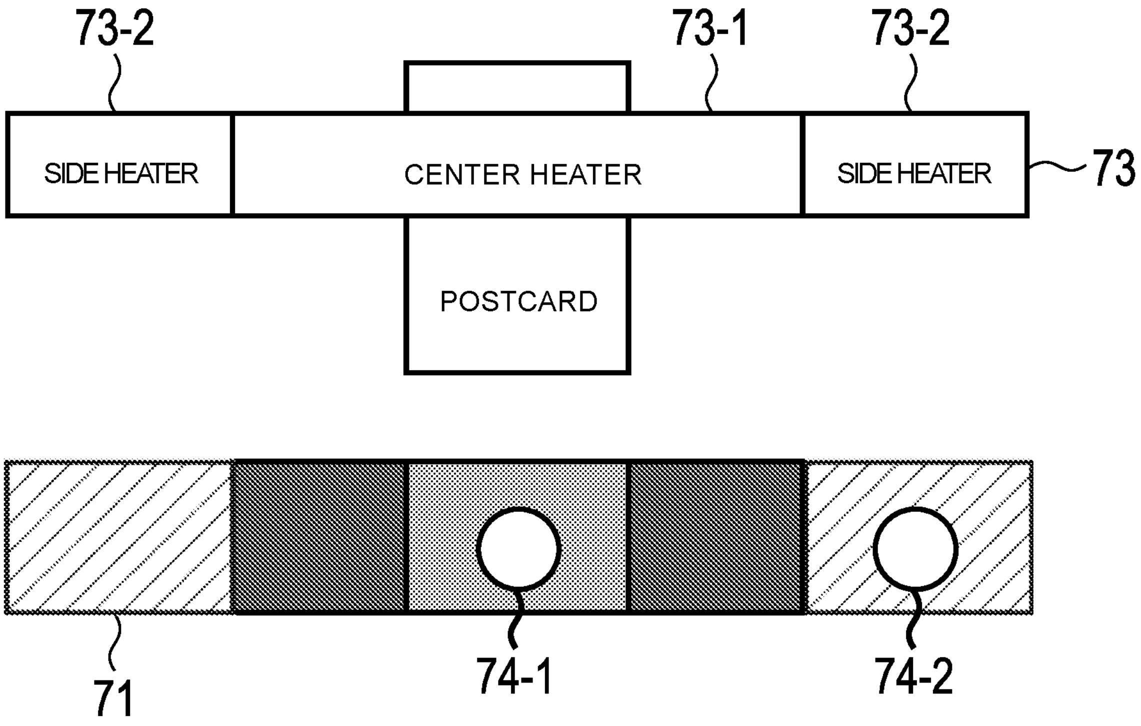
FIG. 5 is a diagram illustrating a temperature distribution of the heat roller observed when a postcard is conveyed according to an embodiment.

FIG. 5 illustrates an example of a temperature distribution of the heat roller 71 observed when the postcard is conveyed.

The width of the postcard is less than the size of the center heater 73-1 in the longitudinal direction. Therefore, the postcard faces a part of a portion of the heat roller 71 facing the center heater 73-1. The postcard faces none of the portions of the heat roller 71 that face the two side heaters 73-2. The heater energization control circuit 14 supplies the energizing power PC to the center heater 73-1. The center heater 73-1 generates heat using the energizing power PC and thereby heats a portion of the heat roller 71 facing the center heater 73-1. The heater energization control circuit 14 does not supply the energizing power PS to the two side heaters 73-2. The two side heaters 73-2 do not heat the portions of the heat roller 71 that face the two side heaters 73-2. The portion of the heat roller 71 facing the center heater 73-1 includes a portion being heated and facing the postcard and portions being heated and not facing the postcard. The portions of the heat roller 71 facing the two side heaters 73-2 are not heated and do not face the postcard. The portion being heated and facing the postcard is indicated in light gray. The portions being heated and not facing the postcard are indicated in dark gray. The portions not being heated and not facing the postcard are indicated by hatching. The temperature of the portion being heated and facing the postcard is controlled by the heater energization control circuit 14 to match a target temperature. The temperature of the portions being heated and not facing the postcard is higher than the target temperature because heat is not removed by the postcard and is accumulated. The portions not being heated and not facing the postcard are at the room temperature. The area of the portions being heated and not facing the postcard is greater than the area of the portions being heated and not facing the A4 portrait sheet illustrated in FIG. 4.

Next, a case where the print medium P is an envelope is described.

Figure 6:
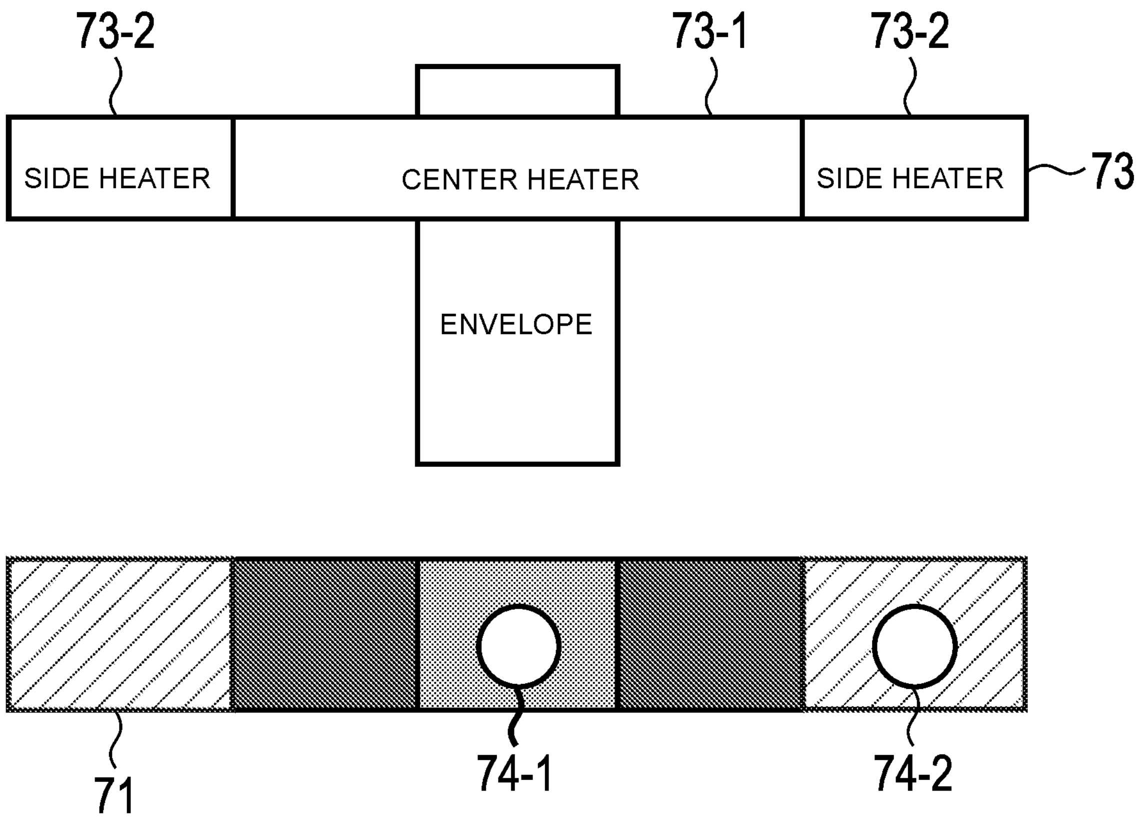
FIG. 6 is a diagram illustrating a temperature distribution of the heat roller observed when an envelope is conveyed according to an embodiment.

FIG. 6 illustrates an example of a temperature distribution of the heat roller 71 observed when the envelope is conveyed.

The width of the envelope is less than the size of the center heater 73-1 in the longitudinal direction. Therefore, the envelope faces a part of a portion of the heat roller 71 facing the center heater 73-1. The envelope faces none of the portions of the heat roller 71 facing the two side heaters 73-2. The heater energization control circuit 14 supplies the energizing power PC to the center heater 73-1. The center heater 73-1 generates heat using the energizing power PC and thereby heats the portion of the heat roller 71 facing the center heater 73-1. The heater energization control circuit 14 does not supply the energizing power PS to the two side heaters 73-2. The two side heaters 73-2 do not heat the portions of the heat roller 71 that face the two side heaters 73-2.

The portion of the heat roller 71 facing the center heater 73-1 includes a portion being heated and facing the envelope and portions being heated and not facing the envelope. The portions of the heat roller 71 facing the two side heaters 73-2 are not heated and do not face the envelope. The portion being heated and facing the envelope is indicated in light gray. The portions being heated and not facing the envelope are indicated in dark gray. The portions not being heated and not facing the envelope are indicated by hatching. The temperature of the portion being heated and facing the envelope is controlled by the heater energization control circuit 14 to match a target temperature. The temperature of the portions being heated and not facing the postcard is higher than the target temperature because heat is not removed by the envelope and is accumulated. The portions not being heated and not facing the envelope are at the room temperature. The area of the portions being heated and not facing the envelope is greater than the area of the portions being heated and not facing the A4 portrait sheet illustrated in FIG. 4.

Figure 7:
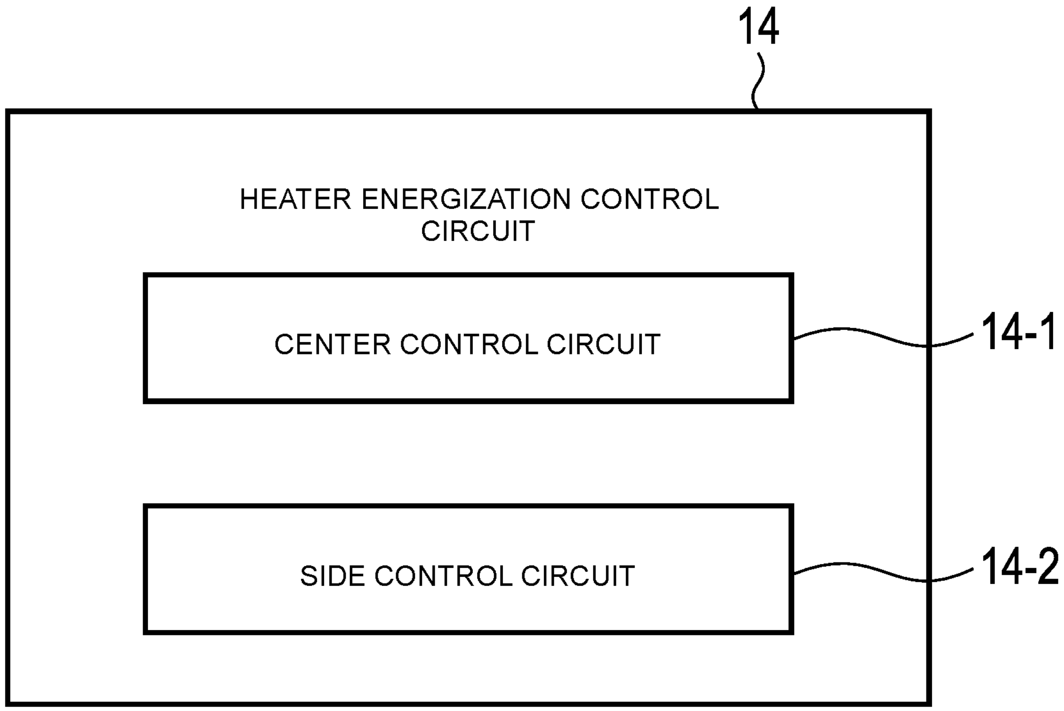
FIG. 7 is a diagram illustrating a configuration of a heater energization control circuit according to an embodiment.

Next, the heater energization control circuit 14 is described. FIG. 7 illustrates an example of a configuration of the heater energization control circuit 14. The heater energization control circuit 14 includes a center control circuit 14-1 and a side control circuit 14-2.

The center control circuit 14-1 controls the energization of the center heater 73-1 of the fixing device 21 and supplies the energizing power PC to the center heater 73-1. The center control circuit 14-1 supplies the energizing power PC to the center heater 73-1 and thereby controls the surface temperature of the heat roller 71 to which heat is transferred from the center heater 73-1. For example, heat is transferred from the center heater 73-1 to the portion of the heat roller 71 facing the center heater 73-1. Here, the center control circuit 14-1 supplies the energizing power PC to the center heater 73-1 regardless of the width of the print medium P being used.

The side control circuit 14-2 controls the energization of the two side heaters 73-2 of the fixing device 21 and supplies the energizing power PS to the two side heaters 73-2. The side control circuit 14-2 supplies the energizing power PS to the two side heaters 73-2 and thereby controls the surface temperature of portions of the heat roller 71 to which heat is transferred from the two side heaters 73-2. For example, heat is transferred from the two side heaters 73-2 to portions of the heat roller 71 that face the two side heaters 73-2. The side control circuit 14-2 starts or stops energizing the two side heaters 73-2 according to the width of the print medium P being used. When the print medium P being used faces parts of portions of the heat roller 71 facing the two side heaters 73-2, the side control circuit 14-2 energizes the two side heaters 73-2. When the print medium P being used does not face the portions of the heat roller 71 facing the two side heaters 73-2, the side control circuit 14-2 stops energizing the two side heaters 73-2.

Figure 8:
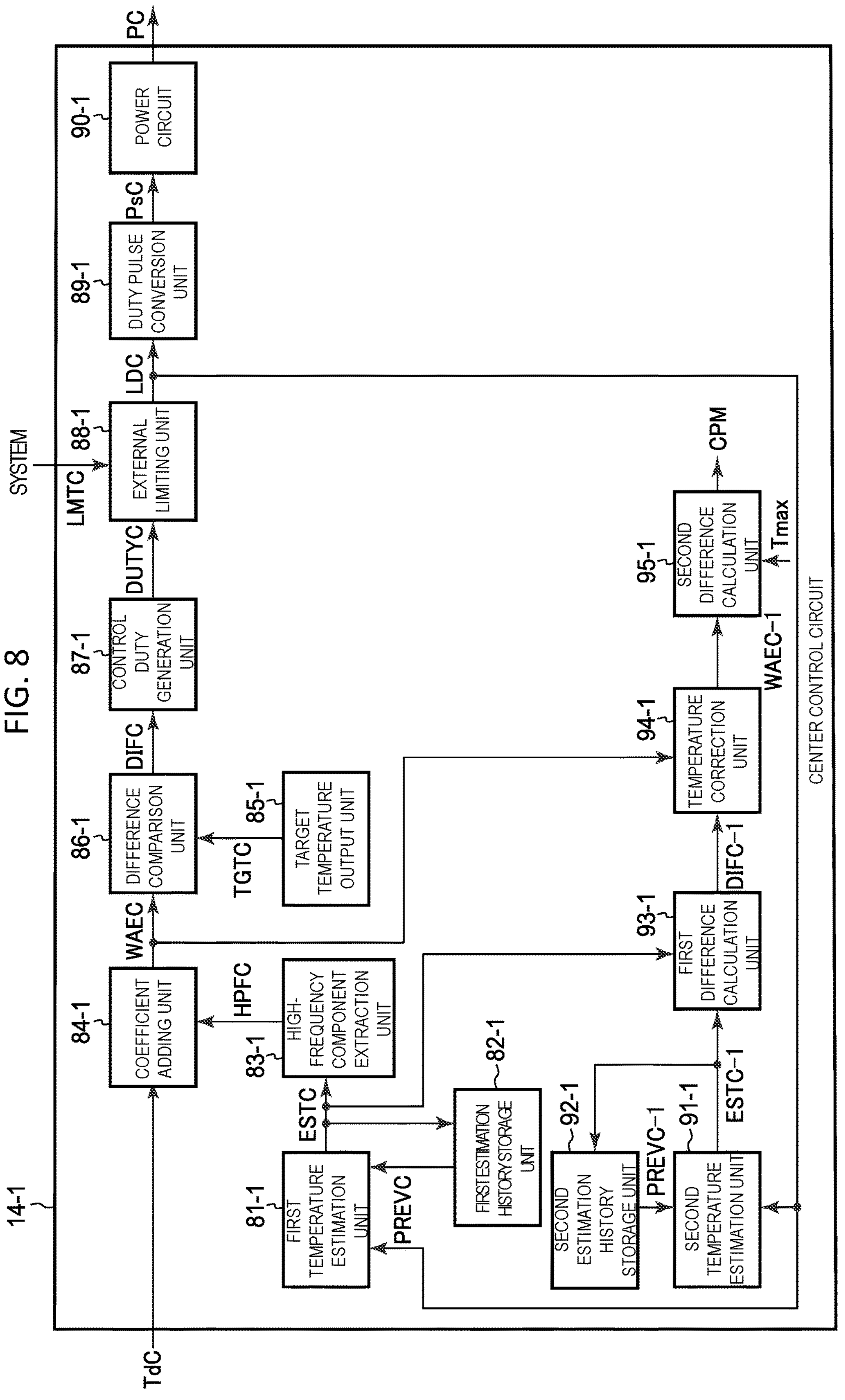
FIG. 8 is a circuit diagram of a center control circuit according to an embodiment.

Next, the center control circuit 14-1 is described. FIG. 8 illustrates an example of a circuit configuration of the center control circuit 14-1. In the descriptions of FIG. 8, a portion facing the print medium P in a portion of the heat roller 71 facing the center heater 73-1 is referred to as the portion of the heat roller 71 facing the print medium P. A portion not facing the print medium P in a portion of the heat roller 71 facing the center heater 73-1 is referred to as the portion of the heat roller 71 not facing the print medium P.

As illustrated in FIG. 8, the center control circuit 14-1 includes a first temperature estimation unit 81-1, a first estimation history storage unit 82-1, a high-frequency component extraction unit 83-1, a coefficient adding unit 84-1, a target temperature output unit 85-1, a difference comparison unit 86-1, a control duty generation unit 87-1, an external limiting unit 88-1, a duty pulse conversion unit 89-1, a power circuit 90-1, a second temperature estimation unit 91-1, a second estimation history storage unit 92-1, a first difference calculation unit 93-1, a temperature correction unit 94-1, and a second difference calculation unit 95-1. The center control circuit 14-1 receives the temperature detection result TdC from the temperature sensor 74-1.

The first temperature estimation unit 81-1 performs a temperature estimation process for estimating the surface temperature of the portion of the heat roller 71 facing the print medium P. The first temperature estimation unit 81-1 estimates the surface temperature of the portion of the heat roller 71 facing the print medium P through a real-time simulation of an equivalent thermal circuit. The first temperature estimation unit 81-1 receives a first estimation history PREVC from the first estimation history storage unit 82-1 and a duty value LDC from the external limiting unit 88-1.

The first estimation history PREVC is a history of a first temperature estimation result ESTC obtained by the first temperature estimation unit 81-1. The first estimation history PREVC may also refer to a signal indicating a history of the first temperature estimation result ESTC obtained by the first temperature estimation unit 81-1. The history of the first temperature estimation result ESTC obtained by the first temperature estimation unit 81-1 includes multiple first temperature estimation results ESTC previously obtained. The first temperature estimation result ESTC indicates the surface temperature of the portion of the heat roller 71 facing the print medium P and is estimated by the first temperature estimation unit 81-1 based at least on the duty value LDC. The surface temperature, which is estimated by the first temperature estimation unit 81-1, of the portion of the heat roller 71 facing the print medium P may also be referred to as an estimated surface temperature of the portion of the heat roller 71 facing the print medium P. The first temperature estimation result ESTC is also used to control the estimated surface temperature of the portion of the heat roller 71 facing the print medium P. The first temperature estimation result ESTC may also refer to a signal indicating the surface temperature, which is estimated by the first temperature estimation unit 81-1 based at least on the duty value LDC, of the portion of the heat roller 71 facing the print medium P.

The duty value LDC is a duty value based on a duty value DUTYC generated by the control duty generation unit 87-1. The duty value LDC may also refer to a signal indicating a duty value based on the duty value DUTYC. The duty value LDC may be the same as the duty value DUTYC or may be different from the duty value DUTYC. When the external limiting unit 88-1 does not limit the duty value DUTYC, the duty value LDC is the same as the duty value DUTYC. When the external limiting unit 88-1 limits the duty value DUTYC, the duty value LDC is a limited duty value that has been limited by the external limiting unit 88-1 and is different from the duty value DUTYC. The duty value DUTYC may also refer to a signal indicating a duty value generated by the control duty generation unit 87-1.

The first temperature estimation unit 81-1 estimates the surface temperature of the portion of the heat roller 71 facing the print medium P based on the duty value LDC. The first temperature estimation unit 81-1 generates the first temperature estimation result ESTC based on the estimation. The first temperature estimation unit 81-1 outputs the first temperature estimation result ESTC to the first estimation history storage unit 82-1, the high-frequency component extraction unit 83-1, and the first difference calculation unit 93-1. As described above, the duty value LDC is generated based on the duty value DUTYC. Therefore, estimating a surface temperature based on the duty value LDC can mean estimating a surface temperature based on the duty value DUTYC. As described above, the duty value LDC may also be a limited duty value that has been limited by the external limiting unit 88-1. Therefore, estimating a surface temperature based on the duty value LDC includes estimating a surface temperature based on the limited duty value that has been limited by the external limiting unit 88-1. An energizing pulse PsC is generated based on the duty value LDC. Therefore, estimating a surface temperature based on the duty value LDC can mean estimating a surface temperature based on the amount of power supplied to the center heater 73-1.

As a typical example, the first temperature estimation unit 81-1 estimates the surface temperature of the portion of the heat roller 71 facing the print medium P based on the first estimation history PREVC and the duty value LDC. Estimating a surface temperature based on the first estimation history PREVC and the duty value LDC can mean estimating a surface temperature based on the first estimation history PREVC and the duty value DUTYC. Estimating a surface temperature based on the first estimation history PREVC and the duty value LDC includes estimating a surface temperature based on the first estimation history PREVC and a limited duty value that has been limited by the external limiting unit 88-1. Estimating a surface temperature based on the first estimation history PREVC and the duty value LDC can mean estimating a surface temperature based on the first estimation history PREVC and the amount of power supplied to the center heater 73-1.

The first temperature estimation unit 81-1 may use the energizing pulse PsC instead of the duty value LDC. The energizing pulse PsC is used to energize the center heater 73-1.

The first estimation history storage unit 82-1 stores the first estimation history PREVC. The first estimation history storage unit 82-1 outputs the first estimation history PREVC to the first temperature estimation unit 81-1.

The high-frequency component extraction unit 83-1 performs high-pass filtering for extracting a high-frequency component from the first temperature estimation result ESTC. For example, the high-frequency component extraction unit 83-1 cancels a direct-current component in the first temperature estimation result ESTC and extracts only the high-frequency component. The high-frequency component extraction unit 83-1 generates a high-frequency component HPFC and outputs the high-frequency component HPFC to the coefficient adding unit 84-1. The high-frequency component HPFC is the high-frequency component of the first temperature estimation result ESTC extracted by the high-frequency component extraction unit 83-1. The high-frequency component HPFC may also refer to a signal indicating the high-frequency component of the first temperature estimation result ESTC extracted by the high-frequency component extraction unit 83-1.

The coefficient adding unit 84-1 performs a coefficient addition process for correcting the first temperature estimation result ESTC. The coefficient adding unit 84-1 receives the temperature detection result TdC from the temperature sensor 74-1 and the high-frequency component HPFC from the high-frequency component extraction unit 83-1. The coefficient adding unit 84-1 obtains a first temperature correction result WAEC based on the high-frequency component HPFC and the temperature detection result TdC. The first temperature correction result WAEC is a corrected temperature of the portion of the heat roller 71 facing the print medium P. The corrected temperature of the portion of the heat roller 71 facing the print medium P is a temperature obtained by correcting the first temperature estimation result ESTC. The first temperature correction result WAEC is obtained by correcting the temperature detection result TdC based on the high-frequency component HPFC in order to correct the first temperature estimation result ESTC. The first temperature correction result WAEC may also refer to a signal indicating the corrected temperature of the portion of the heat roller 71 facing the print medium P. The coefficient adding unit 84-1 outputs the first temperature correction result WAEC to the difference comparison unit 86-1 and the temperature correction unit 94-1.

Specifically, the coefficient adding unit 84-1 multiplies the high-frequency component HPFC by a preset coefficient KC. The coefficient adding unit 84-1 adds a value obtained by multiplying the high-frequency component HPFC by the coefficient KC to the temperature detection result TdC. The coefficient adding unit 84-1 obtains the first temperature correction result WAEC by using a formula "TdC+KC×HPFC". The high-frequency component HPFC is based on the first temperature estimation result ESTC. Therefore, obtaining the first temperature correction result WAEC based on the high-frequency component HPFC and the temperature detection result TdC can mean obtaining the first temperature correction result WAEC based on the first temperature estimation result ESTC and the temperature detection result TdC.

For example, when the coefficient KC is 1, the coefficient adding unit 84-1 simply adds the high-frequency component HPFC to the temperature detection result TdC. As another example, when the coefficient KC is 0.1, the coefficient adding unit 84-1 adds one-tenth of the high-frequency component HPFC to the temperature detection result TdC. In this case, the effect of the high-frequency component HPFC is weakened, and the first temperature correction result WAEC becomes close to the temperature detection result TdC. When, for example, the coefficient KC is greater than or equal to 1, the effect of the high-frequency component HPFC becomes stronger. According to experiments, it is preferable to set a value close to 1 as the coefficient KC used by the coefficient adding unit 84-1 rather than setting an extreme value. The first temperature correction result WAEC appropriately follows the actual surface temperature of the portion of the heat roller 71 facing the print medium P.

The target temperature output unit 85-1 performs an output process for outputting a preset target temperature TGTC to the difference comparison unit 86-1. The target temperature TGTC is the target temperature of the surface temperature of the portion of the heat roller 71 facing the print medium P. The target temperature TGTC may also refer to a signal indicating the target temperature. The target temperature TGTC is changeable by a rewrite command from the processor 22. The target temperature TGTC may be stored in the memory 23.

For example, the target temperature TGTC is set for each printing process and varies depending on the property of the print medium P used for each printing process. An example of the property is thickness. Generally, the target temperature TGTC is determined such that a predetermined temperature can be maintained when the print medium P is plain paper. The amount of heat removed from the heat roller 71 by the print medium P when the print medium P passes through the fixing device 21 is greater in a case where cardboard thicker than plain paper is used than in a case where plain paper is used. Accordingly, the surface temperature of the portion of the heat roller 71 facing the print medium P is more likely to decrease in a case where printing is performed on cardboard than in a case where printing is performed on plain paper. When the print medium P is cardboard, the target temperature TGTC is set at a value greater than the target temperature TGTC associated with plain paper by considering the amount of heat removed from the heat roller 71 by cardboard. This makes it easier to maintain the surface temperature of the portion of the heat roller 71 facing the print medium P at a predetermined temperature. When the print medium P is thinner than plain paper, the target temperature TGTC is set at a value less than the target temperature TGTC associated with plain paper.

In another example, the target temperature TGTC varies depending on the states of the printing process. For example, the states of the printing process include, but are not limited to, inrush current protection, startup heating, ready, start printing, during printing, and energy-saving ready. Different target temperatures TGTC are set for the different states of printing. The target temperatures TGTC for the respective states may be predetermined or may be variable.

The difference comparison unit 86-1 performs a difference calculation process. The difference comparison unit 86-1 receives the first temperature correction result WAEC from the coefficient adding unit 84-1 and the target temperature TGTC from the target temperature output unit 85-1. The difference comparison unit 86-1 compares the target temperature TGTC with the first temperature correction result WAEC. The difference comparison unit 86-1 obtains a first difference DIFC based on the comparison between the target temperature TGTC and the first temperature correction result WAEC. The first difference DIFC is a difference between the target temperature TGTC and the first temperature correction result WAEC. The first difference DIFC may also refer to a signal indicating the difference between the target temperature TGTC and the first temperature correction result WAEC. The difference comparison unit 86-1 outputs the first difference DIFC to the control duty generation unit 87-1.

Although it is assumed here that the first difference DIFC is obtained by subtracting the target temperature TGTC from the first temperature correction result WAEC, the first difference DIFC may instead be obtained by subtracting the first temperature correction result WAEC from the target temperature TGTC. In this example, when the first temperature correction result WAEC is less than the target temperature TGTC, the first difference DIFC is a negative value. When the first temperature correction result WAEC is greater than the target temperature TGTC, the first difference DIFC is a positive value. Thus, the first difference DIFC shows the relationship between the target temperature TGTC and the first temperature correction result WAEC.

The control duty generation unit 87-1 performs a duty value generation process for generating the duty value DUTYC. The control duty generation unit 87-1 receives the first difference DIFC from the difference comparison unit 86-1. The control duty generation unit 87-1 generates the duty value DUTYC based on the first difference DIFC. The duty value DUTYC varies depending on the first difference DIFC. When the first temperature correction result WAEC equals the target temperature TGTC, the duty value DUTYC is the center value (i.e., the reference value) of the duty. When the first temperature correction result WAEC is less than the target temperature TGTC, the control duty generation unit 87-1 makes the duty value greater than the center value of the duty to increase the amount of power supplied to the center heater 73-1. The duty value DUTYC is greater than the center value of the duty. On the other hand, when the first temperature correction result WAEC is greater than the target temperature TGTC, the control duty generation unit 87-1 makes the duty value less than the center value of the duty to reduce the amount of power supplied to the center heater 73-1. The duty value DUTYC is less than the center value of the duty. The duty value DUTYC is a real number. For example, the duty value may be represented by a resolution between 0 and 100. The control duty generation unit 87-1 outputs the duty value DUTYC to the external limiting unit 88-1.

As described above, the first temperature correction result WAEC is calculated based on the first temperature estimation result ESTC and the temperature detection result TdC. The first difference DIFC is a difference between the target temperature TGTC and the first temperature correction result WAEC. Therefore, generating the duty value DUTYC based on the first difference DIFC includes generating a duty value based on the first temperature estimation result ESTC, the temperature detection result TdC, and the target temperature TGTC.

The external limiting unit 88-1 performs a limiting process for limiting the duty value DUTYC. The external limiting unit 88-1 receives system protection information LMTC from the processor 22 and the duty value DUTYC from the control duty generation unit 87-1. The external limiting unit 88-1 reflects the system protection information LMTC in the duty value DUTYC and generates the duty value LDC based on the duty value DUTYC. Reflecting the system protection information LMTC in the duty value DUTYC includes applying the system protection information LMTC to the duty value DUTYC. When the duty value DUTYC does not satisfy a limitation indicated by the system protection information LMTC, the external limiting unit 88-1 reflects the system protection information LMTC in the duty value DUTYC and thereby limits the duty value DUTYC. When the duty value DUTYC satisfies the limitation indicated by the system protection information LMTC, the external limiting unit 88-1 does not limit the duty value DUTYC even when reflecting the system protection information LMTC in the duty value DUTYC. The external limiting unit 88-1 outputs the duty value LDC to the first temperature estimation unit 81-1, the duty pulse conversion unit 89-1, and the second temperature estimation unit 91-1.

The system protection information LMTC is used to limit the duty value to protect the image forming apparatus 1. The system protection information LMTC may also refer to a signal indicating information for limiting the duty value to protect the image forming apparatus 1. The system protection information LMTC is changeable according to a command from the processor 22.

For example, the system protection information LMTC indicates at least one of the upper limit and the lower limit of the duty value. The upper limit of the duty value is determined based on the amount of electric power or current that can be supplied to the heater 73. The lower limit of the duty value can be set at any appropriate value. When the duty value DUTYC is greater than the upper limit of the duty value, the duty value DUTYC does not satisfy the limitation indicated by the system protection information LMTC. When the duty value DUTYC is less than the lower limit of the duty value, the duty value DUTYC does not satisfy the limitation indicated by the system protection information LMTC. When the duty value DUTYC is greater than or equal to the lower limit of the duty value and less than or equal to the upper limit of the duty value, the duty value DUTYC satisfies the limitation indicated by the system protection information LMTC.

For example, let us assume that the upper limit of the duty value is 85, the lower limit of the duty value is 0, and the duty value DUTYC is 90. In this case, because the duty value DUTYC is greater than the upper limit of the duty value, the duty value DUTYC does not satisfy the limitation indicated by the system protection information LMTC. The external limiting unit 88-1 reflects the system protection information LMTC in the duty value DUTYC and thereby limits the duty value DUTYC. The external limiting unit 88-1 generates the duty value LDC based on the duty value DUTYC. The duty value LDC is the limited duty value. The limited duty value is 85 that corresponds to the upper limit of the duty value. Next, a case where the duty value DUTYC is 80 is described. Because the duty value DUTYC is greater than or equal to the lower limit of the duty value and less than or equal to the upper limit of the duty value, the duty value DUTYC satisfies the limitation indicated by the system protection information LMTC. The external limiting unit 88-1 does not limit the duty value DUTYC even when reflecting the system protection information LMTC in the duty value DUTYC. The external limiting unit 88-1 generates the duty value LDC based on the duty value DUTYC. In this case, the duty value LDC is 80 that is the same as the duty value DUTYC.

In another example, the system protection information LMTC is a halt instruction to prevent a danger in the image forming apparatus 1. When the duty value DUTYC is a value other than zero, the duty value DUTYC does not satisfy the limitation indicated by the system protection information LMTC. In this case, the external limiting unit 88-1 reflects the system protection information LMTC in the duty value DUTYC and thereby limits the duty value DUTYC. The external limiting unit 88-1 generates the duty value LDC based on the duty value DUTYC. The duty value LDC is the limited duty value. The limited duty value is 0. When the duty value DUTYC is 0, the duty value DUTYC satisfies the limitation indicated by the system protection information LMTC. In this case, the external limiting unit 88-1 does not limit the duty value DUTYC even when reflecting the system protection information LMTC in the duty value DUTYC. The external limiting unit 88-1 generates the duty value LDC based on the duty value DUTYC. The duty value LDC is 0 and is the same as the duty value DUTYC.

The duty pulse conversion unit 89-1 performs a generation process to generate, based on the duty value LDC, the energizing pulse PsC for controlling the energizing power PC to be supplied to the center heater 73-1. The energizing pulse PsC is a pulse signal for controlling the energizing power PC to be supplied to the center heater 73-1. The energizing pulse PsC is a triac gate signal. The duty pulse conversion unit 89-1 receives the duty value LDC from the external limiting unit 88-1. The duty pulse conversion unit 89-1 converts the duty value LDC to an energizing pulse train. The duty pulse conversion unit 89-1 generates the energizing pulse PsC constituting the energizing pulse train. The duty pulse conversion unit 89-1 outputs the energizing pulse PsC to the power circuit 90-1. The duty value LDC is based on the first temperature correction result WAEC. Therefore, generating the energizing pulse PsC based on the duty value LDC can mean generating the energizing pulse PsC based on the first temperature correction result WAEC.

As described above, the duty value LDC may also be a limited duty value that has been limited by the external limiting unit 88-1. Therefore, generating and outputting the energizing pulse PsC based on the duty value LDC includes generating and outputting the energizing pulse PsC based on the limited duty value that has been limited by the external limiting unit 88-1. Generating and outputting the energizing pulse PsC based on the duty value LDC can mean generating and outputting the energizing pulse PsC based on the duty value DUTYC.

The duty pulse conversion unit 89-1 may be configured to select a duty pattern based on the duty value LDC and generate the energizing pulse PsC according to the selected duty pattern. The duty pattern is a pattern corresponding to the duty value. The duty pattern indicates an energizing pulse train formed by arranging 0s or 1s, the number of 0s or 1s corresponding to the duty value. In the energizing pulse train, “1” indicates a turn-on (ON) signal and “0” indicates a turn-off (OFF) signal. The number of is varies depends on the duty value. Duty patterns may be stored in the memory 23.

The duty pulse conversion unit 89-1 may generate the energizing pulse PsC asynchronously with the system operation. Specifically, the duty pulse conversion unit 89-1 may adjust the pulse frequency and the time of outputting the energizing pulse PsC according to an AC voltage frequency of 50 Hz/60 Hz. The duty pulse conversion unit 89-1 obtains an alternating-current voltage phase and, based on the alternating-current voltage phase, performs a synchronous output process for outputting the energizing pulse PsC constituting the energizing pulse train in synchronization with an alternating-current voltage. The duty pulse conversion unit 89-1 outputs the energizing pulse PsC in synchronization with the zero cross of the alternating-current voltage.

The power circuit 90-1 supplies the energizing power PC to the center heater 73-1 based on the energizing pulse PsC. The power circuit 90-1 energizes the center heater 73-1 of the fixing device 21 using the alternating-current voltage supplied from an AC voltage source (not shown). For example, the power circuit 90-1 supplies the energizing power PC to the center heater 73-1 by switching, based on the energizing pulse PsC, between a state in which the alternating-current voltage is supplied from the AC voltage source to the center heater 73-1 and a state in which the alternating-current voltage is not supplied from the AC voltage source. That is, the power circuit 90-1 changes the time for which power is supplied to the center heater 73-1 of the fixing device 21 according to the energizing pulse PsC.

The power circuit 90-1 may be integrated with the fixing device 21. That is, the center control circuit 14-1 may be configured to supply the energizing pulse PsC to a power circuit of the center heater 73-1 of the fixing device 21 instead of supplying the energizing power PC to the center heater 73-1.

As described above, the center control circuit 14-1 adjusts the amount of power supplied to the center heater 73-1 of the fixing device 21. With this configuration, the center control circuit 14-1 controls the surface temperature of the heat roller 71 to which heat is transferred from the center heater 73-1. Here, this control is referred to as "weighted average control with estimate temperature" (WAE control).

The second temperature estimation unit 91-1 performs a temperature estimation process for estimating the surface temperature of the portion of the heat roller 71 not facing the print medium P. The second temperature estimation unit 91-1 estimates the surface temperature of the portion of the heat roller 71 not facing the print medium P by a real-time simulation of an equivalent thermal circuit. The portion of the heat roller 71 not facing the print medium P varies depending on the type of the print medium P. The second temperature estimation unit 91-1 receives a second estimation history PREVC-1 from the second estimation history storage unit 92-1 and the duty value LDC from the external limiting unit 88-1.

The second estimation history PREVC-1 is a history of a second temperature estimation result ESTC-1 obtained by the second temperature estimation unit 91-1. The second estimation history PREVC-1 may also refer to a signal indicating a history of the second temperature estimation result ESTC-1 obtained by the second temperature estimation unit 91-1. The history of the second temperature estimation result ESTC-1 obtained by the second temperature estimation unit 91-1 includes multiple second temperature estimation results ESTC-1 previously obtained. The second temperature estimation result ESTC-1 indicates the surface temperature, which is estimated by the second temperature estimation unit 91-1 based at least on the duty value LDC, of the portion of the heat roller 71 not facing the print medium P. The surface temperature, which is estimated by the second temperature estimation unit 91-1, of the portion of the heat roller 71 not facing the print medium P may also be referred to as an estimated surface temperature of the portion of the heat roller 71 not facing the print medium P. The second temperature estimation result ESTC-1 is also used for high temperature determination of the portion of the heat roller 71 not facing the print medium P. The second temperature estimation result ESTC-1 may also refer to a signal indicating the surface temperature, which is estimated by the second temperature estimation unit 91-1 based at least on the duty value LDC, of the portion of the heat roller 71 not facing the print medium P.

The second temperature estimation unit 91-1 estimates the surface temperature of the portion of the heat roller 71 not facing the print medium P based on the duty value LDC. The second temperature estimation unit 91-1 generates the second temperature estimation result ESTC-1 based on the estimation. The second temperature estimation unit 91-1 outputs the second temperature estimation result ESTC-1 to the second estimation history storage unit 92-1 and the first difference calculation unit 93-1. Estimating a surface temperature based on the duty value LDC can mean estimating a surface temperature based on the duty value DUTYC. Estimating a surface temperature based on the duty value LDC includes estimating a surface temperature based on a limited duty value that has been limited by the external limiting unit 88-1. Estimating a surface temperature based on the duty value LDC can mean estimating a surface temperature based on the amount of power supplied to the center heater 73-1.

As a typical example, the second temperature estimation unit 91-1 estimates the surface temperature of the portion of the heat roller 71 not facing the print medium P based on the second estimation history PREVC-1 and the duty value LDC. Estimating a surface temperature based on the second estimation history PREVC-1 and the duty value LDC can mean estimating a surface temperature based on the second estimation history PREVC-1 and the duty value DUTYC. Estimating a surface temperature based on the second estimation history PREVC-1 and the duty value LDC includes estimating a surface temperature based on the second estimation history PREVC-1 and a limited duty value that has been limited by the external limiting unit 88-1. Estimating a surface temperature based on the second estimation history PREVC-1 and the duty value LDC can mean estimating a surface temperature based on the second estimation history PREVC-1 and the amount of power supplied to the center heater 73-1.

The second temperature estimation unit 91-1 may use the energizing pulse PsC instead of the duty value LDC.

The second estimation history storage unit 92-1 stores the second estimation history PREVC-1. The second estimation history storage unit 92-1 outputs the second estimation history PREVC-1 to the second temperature estimation unit 91-1.

The first difference calculation unit 93-1 performs a difference calculation process. The first difference calculation unit 93-1 receives the first temperature estimation result ESTC from the first temperature estimation unit 81-1 and the second temperature estimation result ESTC-1 from the second temperature estimation unit 91-1. The first difference calculation unit 93-1 obtains a second difference DIFC-1 based on the first temperature estimation result ESTC and the second temperature estimation result ESTC-1. The second difference DIFC-1 is a difference between the first temperature estimation result ESTC and the second temperature estimation result ESTC-1. The second difference DIFC-1 may also refer to a signal indicating a difference between the first temperature estimation result ESTC and the second temperature estimation result ESTC-1. Here, it is assumed that the second difference DIFC-1 is obtained by subtracting the first temperature estimation result ESTC from the second temperature estimation result ESTC-1. Because the second temperature estimation result ESTC-1 is greater than the first temperature estimation result ESTC, the second difference DIFC-1 is a positive value. The first difference calculation unit 93-1 outputs the second difference DIFC-1 to the temperature correction unit 94-1.

Here, the first temperature estimation result ESTC and the second temperature estimation result ESTC-1 are obtained by real-time simulations of similar thermal circuits. This makes it possible to reduce the error between the second difference DIFC-1 and an actual difference. The actual difference is a difference between the actual surface temperature of the portion of the heat roller 71 facing the print medium P and the actual surface temperature of the portion of the heat roller 71 not facing the print medium P. This also improves the accuracy in obtaining a second temperature correction result WAEC-1 described later.

The temperature correction unit 94-1 performs an addition process for correcting the second temperature estimation result ESTC-1. The temperature correction unit 94-1 receives the first temperature correction result WAEC from the coefficient adding unit 84-1 and the second difference DIFC-1 from the first difference calculation unit 93-1. The temperature correction unit 94-1 obtains the second temperature correction result WAEC-1 based on the first temperature correction result WAEC and the second difference DIFC-1. The second temperature correction result WAEC-1 is a corrected temperature of the portion of the heat roller 71 not facing the print medium P. The corrected temperature of the portion of the heat roller 71 not facing the print medium P is obtained by correcting the second temperature estimation result ESTC-1. The second temperature correction result WAEC-1 is obtained by adding the second difference DIFC-1 to the first temperature correction result WAEC. The second temperature correction result WAEC-1 may also refer to a signal indicating the corrected temperature of the portion of the heat roller 71 not facing the print medium P. Because the second difference DIFC-1 is a positive value, the second temperature correction result WAEC-1 is greater than the first temperature correction result WAEC. The temperature correction unit 94-1 outputs the second temperature correction result WAEC-1 to the second difference calculation unit 95-1. The second difference DIFC-1 is based on the first temperature estimation result ESTC and the second temperature estimation result ESTC-1. Therefore, obtaining the second temperature correction result WAEC-1 based on the first temperature correction result WAEC and the second difference DIFC-1 can mean obtaining the second temperature correction result WAEC-1 based on the first temperature estimation result ESTC, the second temperature estimation result ESTC-1, and the first temperature correction result WAEC.

Here, the second temperature estimation result ESTC-1 appropriately follows changes in the actual surface temperature of the portion of the heat roller 71 not facing the print medium P. However, because the second temperature estimation result ESTC-1 is a simulation result, the second temperature estimation result ESTC-1 may differ from the actual surface temperature with a certain bias. The first temperature correction result WAEC is data to which high-pass filtering for cancelling the bias has been applied. The temperature correction unit 94-1 may address the bias by adding the second difference DIFC-1 to the first temperature correction result WAEC. Therefore, the second temperature correction result WAEC-1 appropriately follows the actual surface temperature of the portion of the heat roller 71 not facing the print medium P.

The second difference calculation unit 95-1 performs a difference calculation process. The second difference calculation unit 95-1 receives the second temperature correction result WAEC-1 from the temperature correction unit 94-1 and a maximum temperature Tmax. The maximum temperature Tmax is a threshold indicating the upper limit of the surface temperature of the portion of the heat roller 71 not facing the print medium P. The maximum temperature Tmax is changeable by a rewrite command from the processor 22. The maximum temperature Tmax may be stored in the memory 23.

The second difference calculation unit 95-1 obtains a third difference DIFC-2 based on the second temperature correction result WAEC-1 and the maximum temperature Tmax. The third difference DIFC-2 is a difference between the second temperature correction result WAEC-1 and the maximum temperature Tmax. Here, it is assumed that the third difference DIFC-2 is obtained by subtracting the second temperature correction result WAEC-1 from the maximum temperature Tmax. When the second temperature correction result WAEC-1 is greater than the maximum temperature Tmax, the third difference DIFC-2 is a negative value. When the second temperature correction result WAEC-1 is less than or equal to the maximum temperature Tmax, the third difference DIFC-2 is a positive value.

Based on the third difference DIFC-2, the second difference calculation unit 95-1 outputs a print speed adjustment command CPM for adjusting the print speed to the processor 22. As the print speed decreases, the time required for a print process increases. For example, the print speed includes a conveying speed of the print medium P. As the conveying speed decreases, the time required for a print process increases. Outputting the print speed adjustment command CPM can mean adjusting the print speed.

Here, the third difference DIFC-2 is based on the second temperature correction result WAEC-1. The second temperature correction result WAEC-1 is based on the first temperature correction result WAEC and the second difference DIFC-1. The second difference DIFC-1 is based on the first temperature estimation result ESTC and the second temperature estimation result ESTC-1. Therefore, outputting the print speed adjustment command CPM based on the third difference DIFC-2 can mean outputting the print speed adjustment command CPM based on the second temperature estimation result ESTC-1. Outputting the print speed adjustment command CPM based on the third difference DIFC-2 can mean outputting the print speed adjustment command CPM based on the first temperature estimation result ESTC and the second temperature estimation result ESTC-1. Outputting the print speed adjustment command CPM based on the third difference DIFC-2 can mean outputting the print speed adjustment command CPM based on the first temperature estimation result ESTC, the second temperature estimation result ESTC-1, and the first temperature correction result WAEC. Outputting the print speed adjustment command CPM based on the third difference DIFC-2 can mean outputting the print speed adjustment command CPM based on the second temperature correction result WAEC-1.

When the second temperature correction result WAEC-1 transitions from a temperature less than or equal to the maximum temperature Tmax to a temperature greater than the maximum temperature Tmax, the second difference calculation unit 95-1 outputs the print speed adjustment command CPM. A case where the second temperature correction result WAEC-1 transitions from a temperature less than or equal to the maximum temperature Tmax to a temperature greater than the maximum temperature Tmax is an example of a case where the second temperature correction result WAEC-1 is greater than the maximum temperature Tmax. In this example, the print speed adjustment command CPM is a command to decrease the print speed from a first print speed to a second print speed.

The first print speed is used when the second temperature correction result WAEC-1 is less than or equal to the maximum temperature Tmax. For example, the first print speed includes a first conveyance speed of the print medium P. The second print speed is used when the second temperature correction result WAEC-1 is greater than the maximum temperature Tmax. The second print speed is lower than the first print speed. For example, the second print speed includes a second conveyance speed of the print medium P. The second conveyance speed is lower than the first conveyance speed. Outputting the print speed adjustment command CPM to decrease the print speed from the first print speed to the second print speed can mean decreasing the print speed.

The second print speed may be fixed regardless of the second temperature correction result WAEC-1 or may vary depending on the second temperature correction result WAEC-1. In the latter case, the second difference calculation unit 95-1 may determine the second print speed such that the second print speed decreases as the difference between the second temperature correction result WAEC-1 and the maximum temperature Tmax increases. The second difference calculation unit 95-1 may determine the second print speed based on a table associating temperatures with print speeds or based on a function.

When the second temperature correction result WAEC-1 continues to be greater than the maximum temperature Tmax, the second difference calculation unit 95-1 may output the print speed adjustment command CPM according to changes in the second temperature correction result WAEC-1. In this case, the print speed adjustment command CPM is a command to adjust the print speed to a second print speed corresponding to the second temperature correction result WAEC-1. The second difference calculation unit 95-1 may determine the second print speed such that the second print speed decreases as the difference between the second temperature correction result WAEC-1 and the maximum temperature Tmax increases.

When the second temperature correction result WAEC-1 transitions from a temperature greater than the maximum temperature Tmax to a temperature less than or equal to the maximum temperature Tmax, the second difference calculation unit 95-1 may output the print speed adjustment command CPM. In this case, the print speed adjustment command CPM is a command to increase the print speed from the second print speed to the first print speed.

As described above, the second temperature estimation unit 91-1, the second estimation history storage unit 92-1, the first difference calculation unit 93-1, the temperature correction unit 94-1, and the second difference calculation unit 95-1 are circuits for high temperature determination of the portion of the heat roller 71 not facing the print medium P. The circuit for high temperature determination is applied to a feedback loop for the WAE control described above. The second temperature estimation unit 91-1 uses the duty value LDC generated by the WAE control. The first difference calculation unit 93-1 uses the first temperature estimation result ESTC generated by the WAE control. The temperature correction unit 94-1 uses the first temperature correction result WAEC generated by the WAE control. Thus, the center control circuit 14-1 can add only a process necessary for high temperature determination to the WAE control without changing the process for the WAE control. Accordingly, compared with a case where a process for high temperature determination is performed independently from the process for the WAE control, the center control circuit 14-1 can reduce the processing load.

Components of the center control circuit 14-1 may be implemented by electric circuits or by software. When the components of the center control circuit 14-1 are implemented by software, the processor 22 or a processor other than the processor 22 may execute programs stored in a memory to perform the functions of those components. The processor is, for example, a processing circuit such as a central processing unit (CPU).

A first thermal circuit representing heat transfer for obtaining the first temperature estimation result ESTC and a second thermal circuit representing heat transfer for obtaining the second temperature estimation result ESTC-1 are described.

It is generally known that a thermal circuit operates similarly to an electric circuit obtained by replacing thermal resistors with electric resistors and replacing thermal capacitors with electric capacitors. A thermal circuit includes E, C, and R elements, indicating a voltage source, a capacitance component, and a resistance component, respectively.

Here, there are two paths through which heat escapes from the surface of the heat roller 71. In a first path, heat slowly escapes to the outside via the fixing device 21. In a second path, heat is transferred to the print medium P when the heat roller 71 is pressed against the print medium P, and the print medium P retaining the heat is discharged to the sheet discharge tray 18. The degree of ease with which heat escapes through the second path varies depending on the thickness of the print medium P and also on the print speed.

Figure 9:
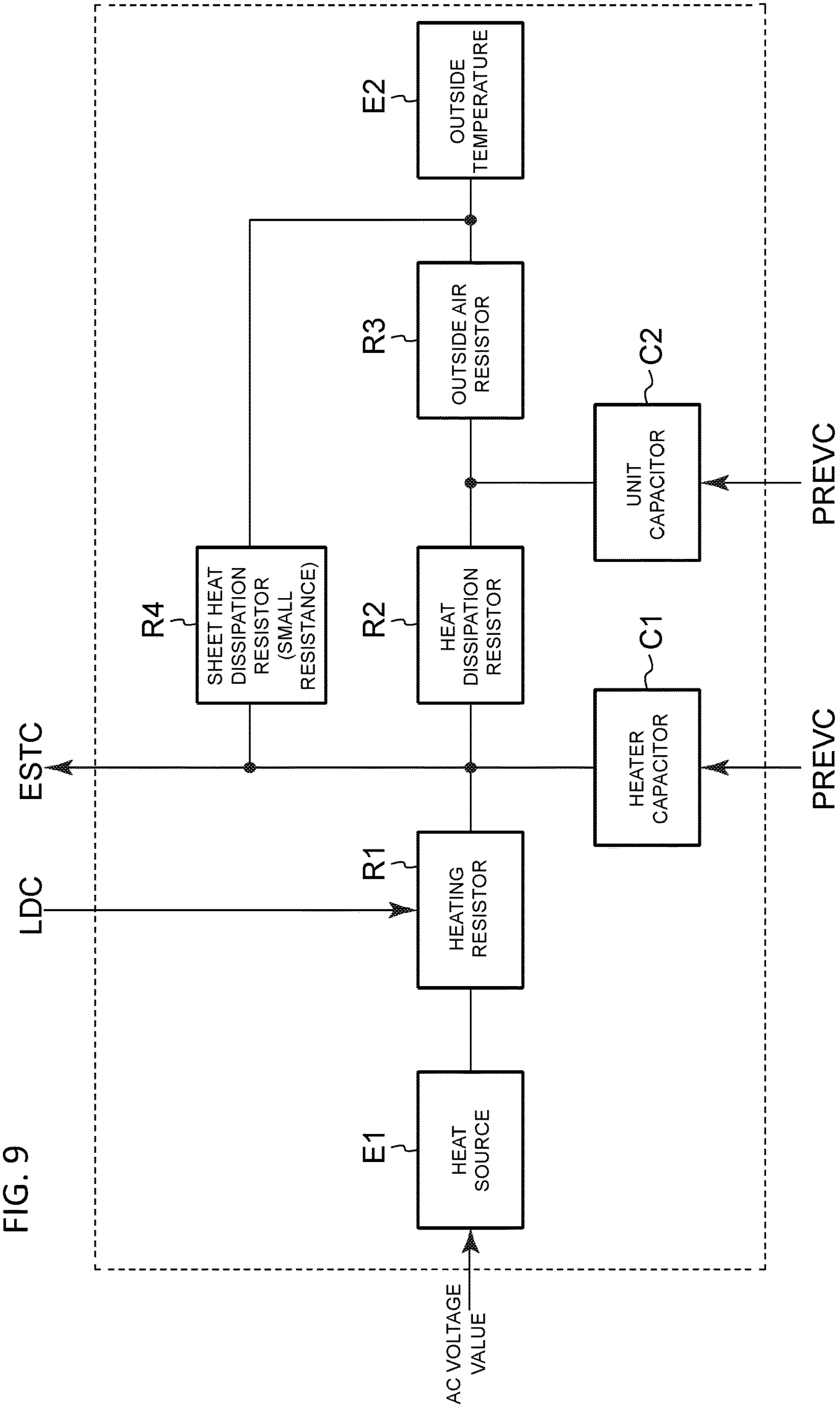
FIG. 9 is a diagram illustrating a first equivalent thermal circuit representing heat transfer for obtaining a first temperature estimation result according to an embodiment.

FIG. 9 illustrates the first thermal circuit. A heat source E1 is equivalent to a direct-current voltage source in an electric circuit. A heating resistor R1 is equivalent to a variable resistor in an electric circuit. The heating resistor R1 uses the duty value LDC as a variable factor. The duty value LDC is a control signal for changing the resistance value of the heating resistor R1 that increases and decreases the inflow of heat. For example, when the duty value LDC is 100%, the heating resistor R1 is set to a resistance value used when the energizing pulse PsC corresponds to 100%. When the duty value LDC is 0%, the energizing pulse PsC corresponds to 0%. Therefore, the heating resistor R1 is set to an extremely large value. When the duty value LDC is greater than 0 and less than 100, the heating resistor R1 is set to a value corresponding to the ratio of the duty value. A heater capacitor C1 refers to the first estimation history PREVC at a short time dt before and updates the first estimation history PREVC to a temperature at the current time.

A heat dissipation resistor R2 represents a resistance value observed when heat escapes from the heat roller 71 to a space inside of the fixing device 21. A unit capacitor C2 refers to the first estimation history PREVC at the short time "dt" before and updates the first estimation history PREVC to a temperature at the current time.

An outside air resistor R3 represents a resistance value of a path through which heat escapes from the space inside of the fixing device 21 and outside of the heat roller 71 to the outside air. An outside temperature E2 is equivalent to a direct-current voltage source in an electric circuit. The relationship between the heat source E1 and the outside temperature E2 is "heat source E1≥outside temperature E2". Specifically, the relationship between the heat source E1 and the outside temperature E2 before start-up is "heat source E1=outside temperature E2", and the relationship between the heat source E1 and the outside temperature E2 during operation is "heat source E1>outside temperature E2".

A sheet heat dissipation resistor R4 represents a resistance value observed when heat escapes to the print medium P.

For example, in the first thermal circuit, E1 is 2500 (V), R1 is 80 (Q) at minimum and is 100000 (Q) at maximum, C1 is 10 (F), R2 is 20 (Q), C2 is 100 (F), R3 is 10 (Q), R4 is 20 (Q), E2 is 25 (V), and the duty value LDC is between 0 and 100%.

For example, the first temperature estimation unit 81-1 performs a real-time simulation of the above-described first thermal circuit using an energy conservation law based on the first estimation history PREVC and the duty value LDC. The first temperature estimation unit 81-1 derives a C1 voltage (i.e., temperature) by the real-time simulation of the first thermal circuit. The first temperature estimation unit 81-1 generates the C1 voltage as the first temperature estimation result ESTC at the current time.

Figure 10:
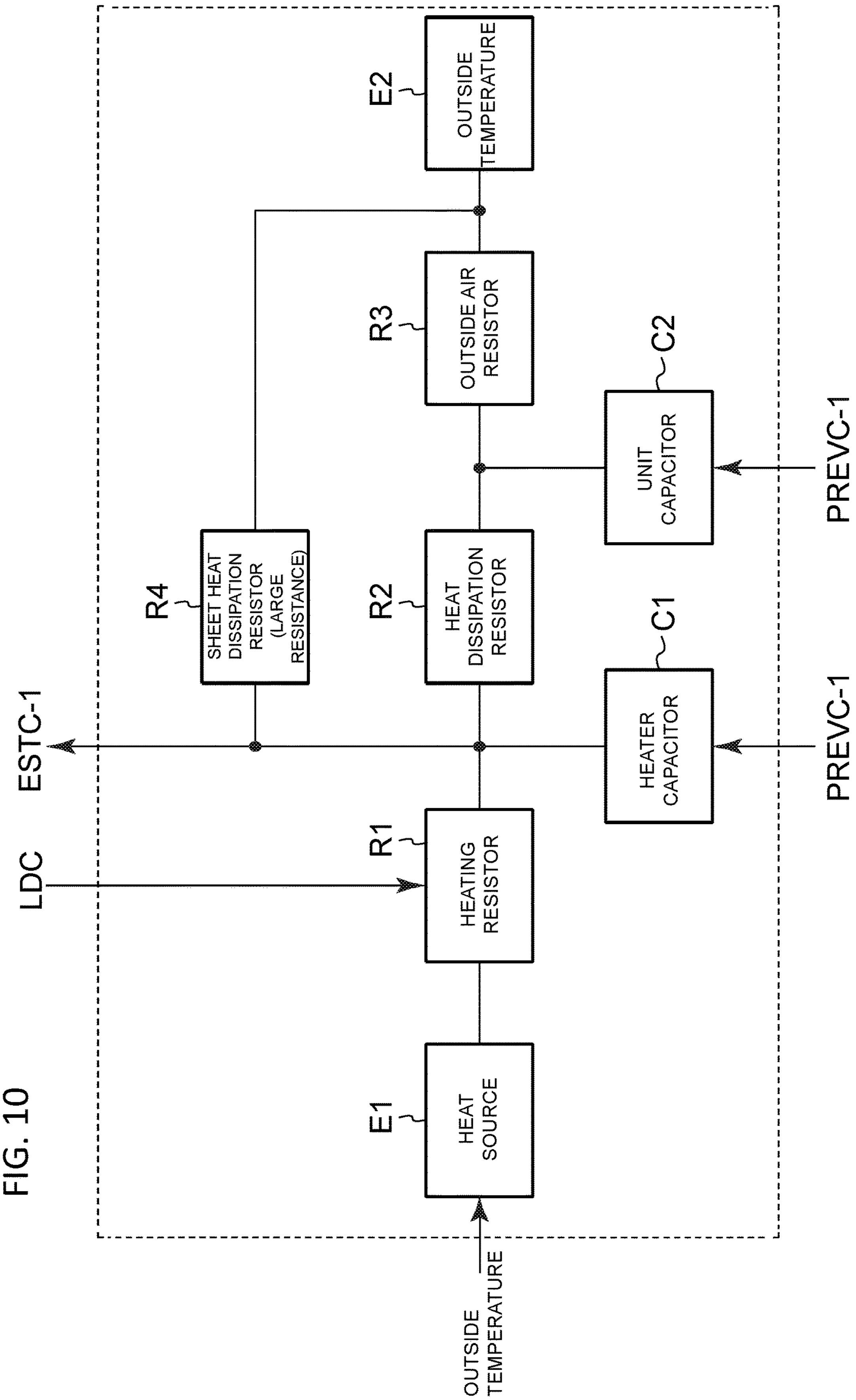
FIG. 10 is a diagram illustrating a second equivalent thermal circuit representing heat transfer for obtaining a second temperature estimation result according to an embodiment.

FIG. 10 illustrates a second thermal circuit. Similarly to the first thermal circuit, the second thermal circuit includes E, C, and R elements. Here, the heater capacitor C1 refers to the second estimation history PREVC-1 at the short time dt before and updates the second estimation history PREVC-1 to a temperature at the current time. The unit capacitor C2 refers to the second estimation history PREVC-1 at the short time dt before and updates the second estimation history PREVC-1 to a temperature at the current time. The resistance value of the sheet heat dissipation resistor R4 in the second thermal circuit is different from the resistance value of the sheet heat dissipation resistor R4 in the first thermal circuit.

Here, a difference between the resistance value of the sheet heat dissipation resistor R4 in the first thermal circuit and the resistance value of the sheet heat dissipation resistor R4 in the second thermal circuit is described. A large amount of heat is removed by the print medium P from the portion of the heat roller 71 facing the print medium P. That is, heat escapes via the print medium P from the portion of the heat roller 71 facing the print medium P. Therefore, the sheet heat dissipation resistor R4 in the first thermal circuit is set to a small resistance value. In contrast, heat is not removed by the print medium P from the portion of the heat roller 71 not facing the print medium P. That is, heat does not escape via the print medium P from the portion of the heat roller 71 not facing the print medium P. Therefore, the sheet heat dissipation resistor R4 in the second thermal circuit is set to a resistance value that is greater than the resistance value of the sheet heat dissipation resistor R4 in the first thermal circuit.

For example, in the second thermal circuit, E1 is 2500 (V), R1 is 80 (Q) at minimum and is 100000 (Q) at maximum, C1 is 10 (F), R2 is 20 (Q), C2 is 100 (F), R3 is 10 (Q), R4 is 100 (Q), E2 is 25 (V), and the duty value LDC is between 0 and 100%. Thus, the values of the E, C, and R elements in the second thermal circuit are the same as the values of the E, C, and R elements in the first thermal circuit except for the value of the sheet heat dissipation resistor R4.

For example, the second temperature estimation unit 91-1 performs a real-time simulation of the above-described second thermal circuit using an energy conservation law based on the second estimation history PREVC-1 and the duty value LDC. The second temperature estimation unit 91-1 derives a C1 voltage (i.e., temperature) by the real-time simulation of the second thermal circuit. The second temperature estimation unit 91-1 generates the C1 voltage as the second temperature estimation result ESTC-1 at the current time.

When the surface temperature of the portion of the heat roller 71 facing the print medium P is controlled to match the target temperature, the surface temperature of the portion of the heat roller 71 not facing the print medium P starts to increase. The second temperature estimation unit 91-1 can estimate the surface temperature of the portion of the heat roller 71 not facing the print medium P by a real-time simulation. The second temperature estimation result ESTC-1 is greater than the first temperature estimation result ESTC.

Figure 11:
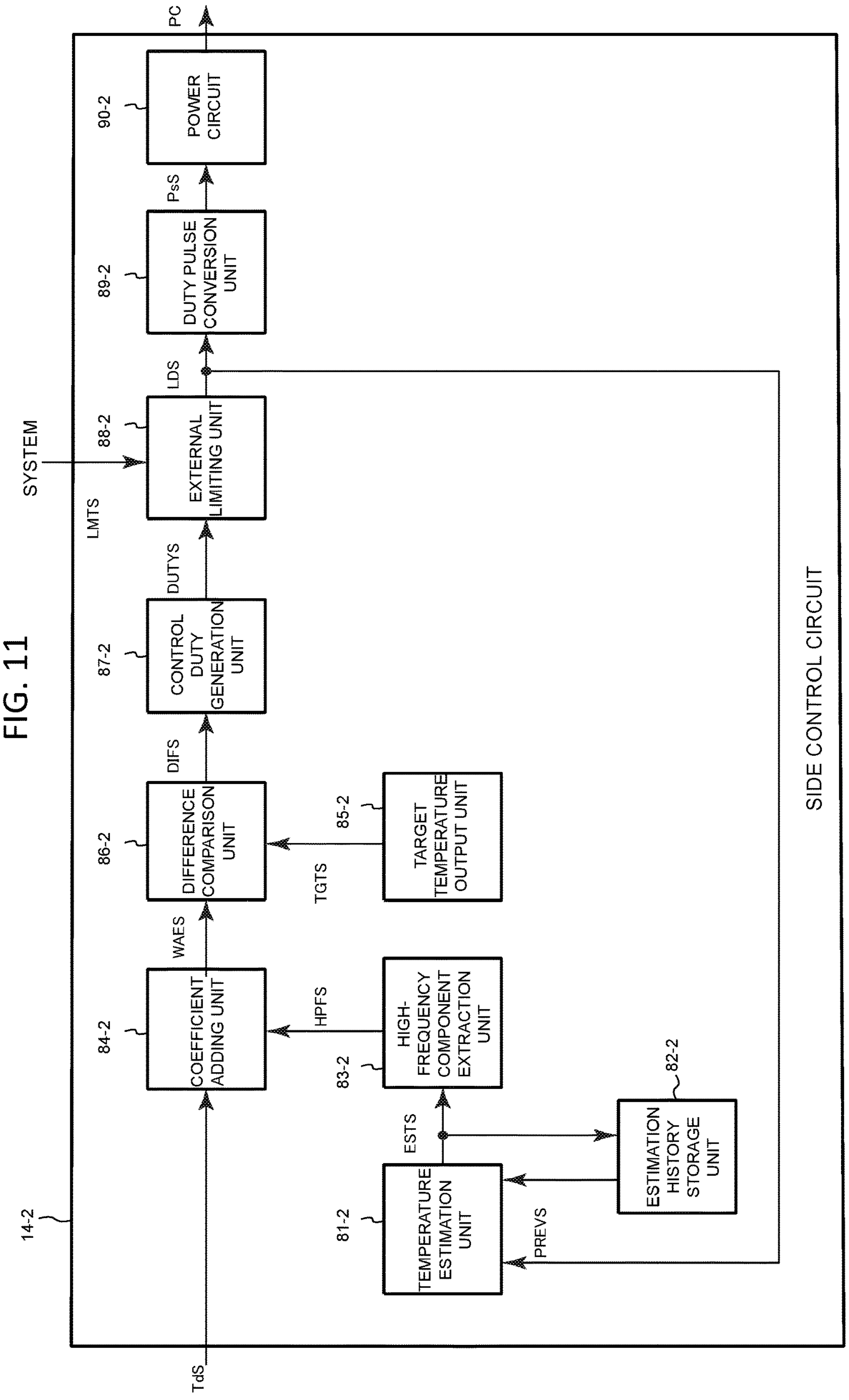
FIG. 11 is a circuit diagram of a side control circuit according to an embodiment.

Next, the side control circuit 14-2 is described. FIG. 11 illustrates an example of a circuit configuration of the side control circuit 14-2. As illustrated in FIG. 11, the side control circuit 14-2 includes a temperature estimation unit 81-2, an estimation history storage unit 82-2, a high-frequency component extraction unit 83-2, a coefficient adding unit 84-2, a target temperature output unit 85-2, a difference comparison unit 86-2, a control duty generation unit 87-2, an external limiting unit 88-2, a duty pulse conversion unit 89-2, and a power circuit 90-2.

The side control circuit 14-2 receives the temperature detection result TdS from the temperature sensor 74-2 and thereby differs from the center control circuit 14-1 that receives the temperature detection result TdC from the temperature sensor 74-1. The side control circuit 14-2 supplies the energizing power PS to the two side heaters 73-2 and thereby differs from the center control circuit 14-1 that supplies the energizing power PC to the center heater 73-1. Other operations in the WAE control performed by the side control circuit 14-2 are substantially the same as those in the WAE control performed by the center control circuit 14-1, and descriptions of those operations are omitted here. The temperature estimation unit 81-2 has a function similar to that of the first temperature estimation unit 81-1 described above. The estimation history storage unit 82-2 has a function similar to that of the first estimation history storage unit 82-1 described above. The high-frequency component extraction unit 83-2 has a function similar to that of the high-frequency component extraction unit 83-1 described above. The coefficient adding unit 84-2 has a function similar to that of the coefficient adding unit 84-1 described above. The target temperature output unit 85-2 has a function similar to that of the target temperature output unit 85-1 described above. The difference comparison unit 86-2 has a function similar to that of the difference comparison unit 86-1 described above. The control duty generation unit 87-2 has a function similar to that of the control duty generation unit 87-1 described above. The external limiting unit 88-2 has a function similar to that of the external limiting unit 88-1 described above. The duty pulse conversion unit 89-2 has a function similar to that of the duty pulse conversion unit 89-1 described above. The power circuit 90-2 has a function similar to that of the power circuit 90-1 described above.

The WAE control performed by the center control circuit 14-1 is described below in detail.

Figure 12:
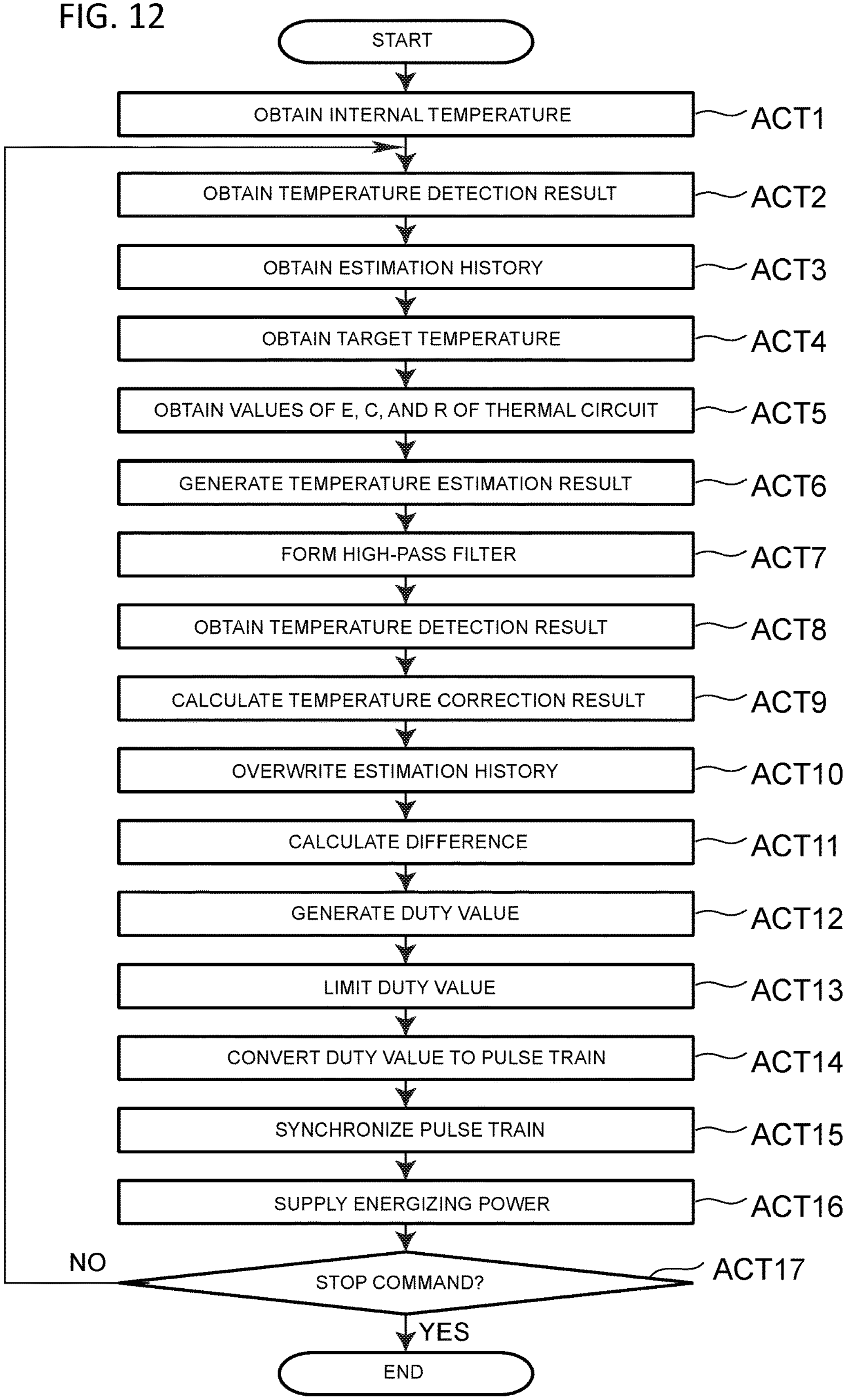
FIG. 12 is a flowchart of WAE control performed by the center control circuit according to an embodiment.
Figure 13:
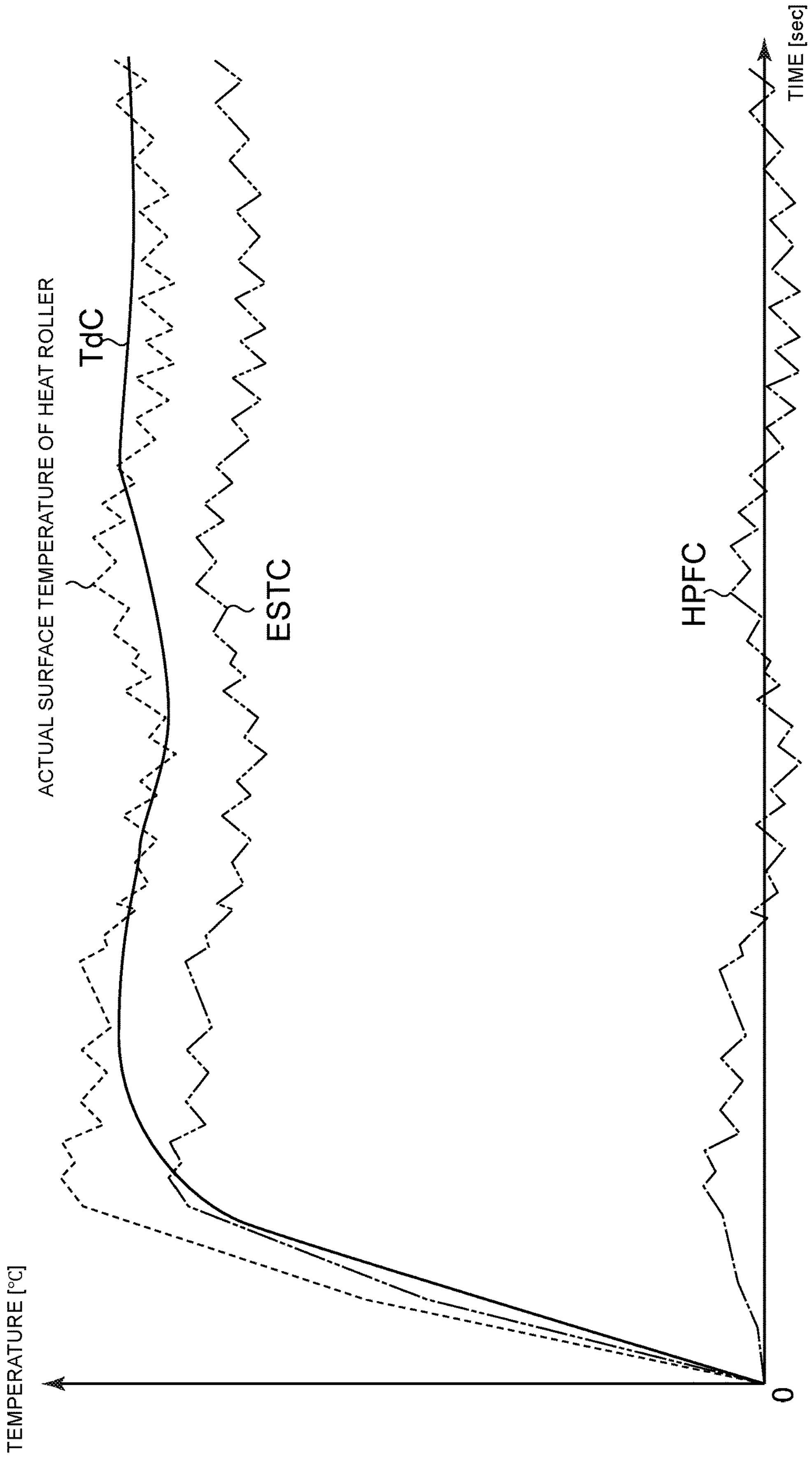
FIGS. 13 and 14 are graphs for describing the WAE control performed by the center control circuit.
Figure 14:
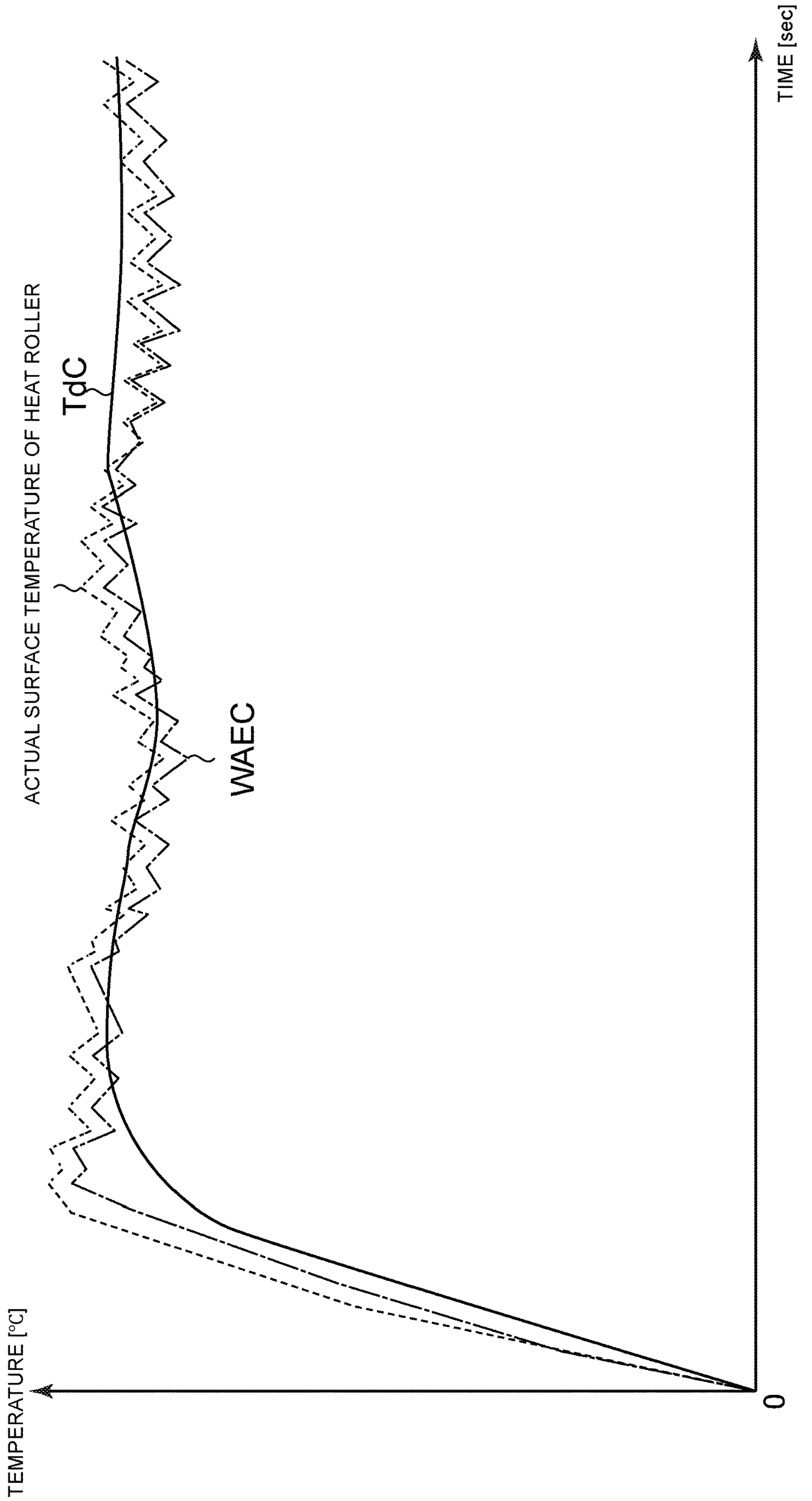

FIG. 12 is a flowchart of the WAE control performed by the center control circuit 14-1 in one embodiment. FIGS. 13 and 14 are graphs describing the WAE control performed by the center control circuit 14-1. In FIGS. 13 and 14, the horizontal axis indicates time, and the vertical axis indicates a temperature. In the descriptions related to FIGS. 12, 13 and 14, "the surface temperature of the heat roller 71" indicates the surface temperature of a portion of the heat roller 71 that faces the center heater 73-1 and also faces the print medium P.

The center control circuit 14-1 obtains the internal temperature of the image forming apparatus 1 (ACT1). Here, because the internal temperature changes slowly, the frequency of obtaining the internal temperature by the center control circuit 14-1 may be low.

The center control circuit 14-1 obtains the temperature detection result TdC at the current time from the temperature sensor 74-1 (ACT 2).

As illustrated in FIG. 13, there is a difference between the temperature detection result TdC and the actual surface temperature of the heat roller 71. The actual surface temperature of the heat roller 71 changes at short intervals because the heat roller 71 is heated intermittently by the center heater 73-1. In contrast, the responsiveness of the temperature sensor 74-1 to temperature changes may be poor due to the thermal capacity and the characteristics of the temperature sensitive material of the temperature sensor 74-1. Particularly, a more inexpensive temperature sensor tends to have lower responsiveness. For this reason, the temperature detection result TdC does not accurately follow the actual surface temperature of the heat roller 71. That is, the detection of the temperature detection result TdC by the temperature sensor 74-1 lags behind the variation of the surface temperature of the heat roller 71. Also, the temperature detection result TdC detected by the temperature sensor 74-1 is smoothed and does not reproduce the small changes in the surface temperature of the heat roller 71.

The first temperature estimation unit 81-1 obtains the first estimation history PREVC at the short time "dt" before from the first estimation history storage unit 82-1 (ACT 3).

The difference comparison unit 86-1 obtains the target temperature TGTC from the target temperature output unit 85-1 (ACT 4).

The first temperature estimation unit 81-1 obtains the values of parameters corresponding to the E, C, and R elements constituting the first thermal circuit described above (ACT 5).

The first temperature estimation unit 81-1 generates the first temperature estimation result ESTC by a real-time simulation of the first thermal circuit (ACT 6).

As illustrated in FIG. 13, the first temperature estimation result ESTC appropriately follows changes in the actual surface temperature of the heat roller 71. However, because the first temperature estimation result ESTC is a simulation result, the absolute value of the first temperature estimation result ESTC may differ from the actual surface temperature of the heat roller 71 due to, for example, differences in conditions.

The high-frequency component extraction unit 83-1 forms a high-pass filter (ACT 7). With the high-pass filter, the high-frequency component extraction unit 83-1 cancels a direct-current component of the first temperature estimation result ESTC and extracts only a high-frequency component from the first temperature estimation result ESTC. The high-frequency component extraction unit 83-1 generates the high-frequency component HPFC.

As illustrated in FIG. 13, the high-frequency component HPFC appropriately follows changes in the actual surface temperature of the heat roller 71.

The coefficient adding unit 84-1 obtains the temperature detection result TdC at the current time from the temperature sensor 74-1 (ACT 8).

The coefficient adding unit 84-1 calculates the first temperature correction result WAEC (ACT 9). In ACT 9, for example, the coefficient adding unit 84-1 obtains the first temperature correction result WAEC using a formula "TdC+KC×HPFC".

FIG. 14 is a graph showing examples of the actual surface temperature of the heat roller 71, the temperature detection result Td, and the first temperature correction result WAEC. In the WAE control, small changes in the surface temperature of the heat roller 71 are estimated based on the temperature detection result TdC and the high-frequency component HPFC of the first temperature estimation result ESTC. With this method, as illustrated in FIG. 14, the first temperature correction result WAEC appropriately follows the actual surface temperature of the heat roller 71.

The first estimation history storage unit 82-1 overwrites the first estimation history PREVC with the first temperature estimation result ESTC (ACT 10).

The difference comparison unit 86-1 obtains the first difference DIFC by comparing the target temperature TGT with the first temperature correction result WAEC (ACT 11).

The control duty generation unit 87-1 generates the duty value DUTYC based on the first difference DIFC (ACT 12).

The external limiting unit 88-1 reflects the system protection information LMTC in the duty value DUTYC and thereby limits the duty value (ACT 13). In ACT 13, for example, the external limiting unit 88-1 generates the duty value LDC based on the duty value DUTYC by reflecting the system protection information LMTC in the duty value DUTYC.

The duty pulse conversion unit 89-1 converts the duty value LDC to an energizing pulse train (ACT 14). The duty pulse conversion unit 89-1 generates the energizing pulse PsC constituting the energizing pulse train.

The duty pulse conversion unit 89-1 outputs the energizing pulse PsC constituting the energizing pulse train in synchronization with an alternating-current voltage (ACT 15).

The power circuit 90-1 supplies the energizing power PC to the center heater 73-1 based on the energizing pulse PsC (ACT 16).

The center control circuit 14-1 determines whether a WAE control stop command has been received (ACT 17). When the WAE control stop command has not been received (NO in ACT 17), the center control circuit 14-1 returns from ACT 17 to ACT 2. When the WAE control stop command has been received (YES in ACT 17), the center control circuit 14-1 ends the process.

As described above, when performing a process in a given cycle, the center control circuit 14-1 performs the WAE control based on values (i.e., the duty value LDC and the first temperature estimation result ESTC: the first estimation history PREVC) obtained in the immediately-preceding cycle and the temperature detection result TsC obtained in the present cycle. That is, the center control circuit 14-1 inherits values from the previous cycle. The center control circuit 14-1 performs the temperature estimation calculation again based on the previous calculation history. Accordingly, the center control circuit 14-1 continuously performs calculations while in operation. In the center control circuit 14-1, calculation results are stored in, for example, a memory and are reused in calculations in the next cycle.

Figure 15:
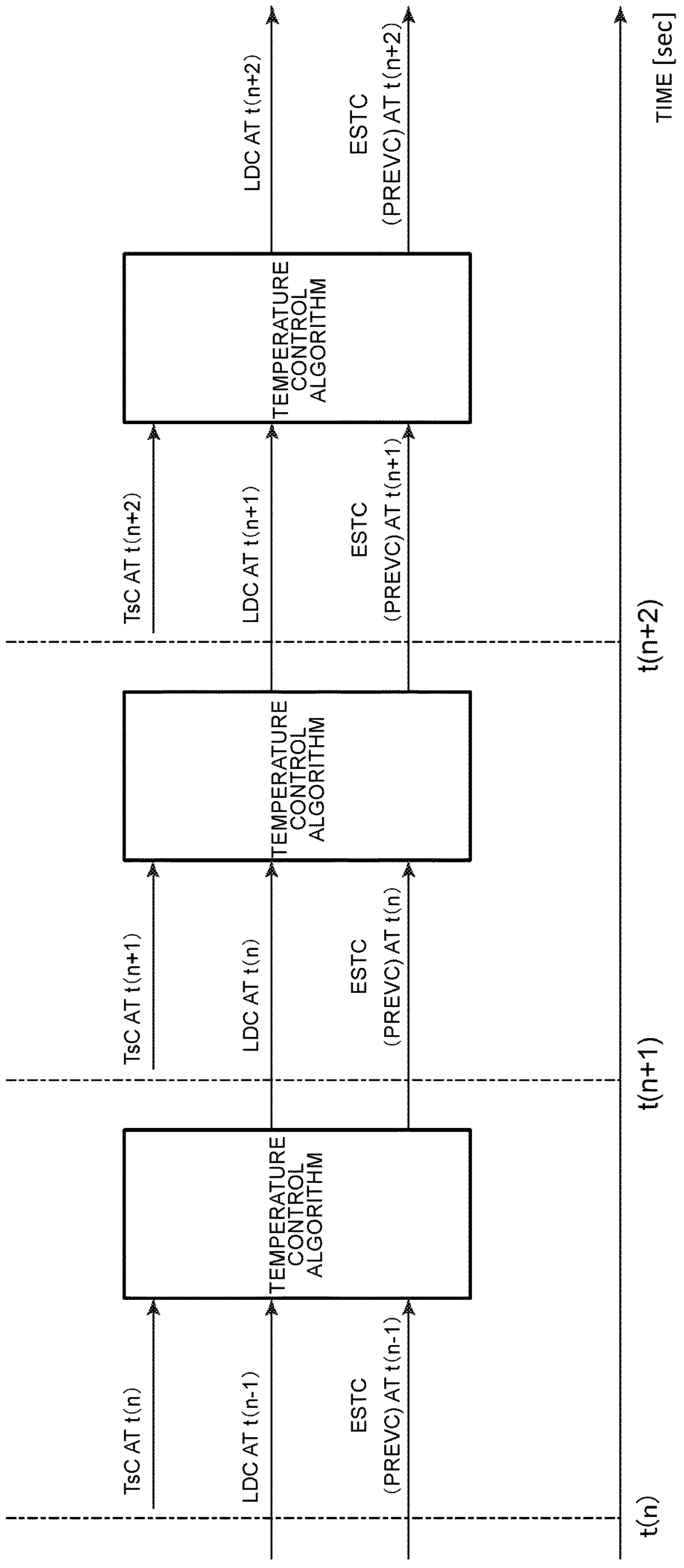
FIG. 15 is a diagram for describing cycles of a process performed by the center control circuit.

FIG. 15 is a diagram describing cycles of a process performed by the center control circuit 14-1. The horizontal axis in FIG. 15 indicates time. For example, the first temperature estimation unit 81-1 performs a temperature estimation process at time t(n), performs the next temperature estimation process at time t(n+1) that is the time dt later after time t(n), and then performs the next temperature estimation process at time t(n+2) that is the time dt later after time t(n+1). Thus, the first temperature estimation unit 81-1 repeatedly performs the temperature estimation process. In the temperature estimation process in each cycle, the first temperature estimation unit 81-1 uses the first temperature estimation result ESTC obtained in the previous cycle to newly estimate a temperature.

At time t(n), the temperature detection result TdC obtained at time t(n), the duty value LDC previously obtained at time t(n−1), and the first temperature estimation result ESTC (i.e., the first estimation history PREVC) previously obtained at time t(n−1) are used. The first temperature estimation unit 81-1 performs a process based on input signals and outputs the first temperature estimation result ESTC obtained at the time t(n). The high-frequency component extraction unit 83-1, the coefficient adding unit 84-1, the target temperature output unit 85-1, the difference comparison unit 86-1, the control duty generation unit 87-1, and the external limiting unit 88-1 perform processes based on input signals. The external limiting unit 88-1 outputs the duty value LDC obtained at time t(n).

At time t(n+1), the temperature detection result TdC newly detected at time t(n+1), the duty value LDC obtained at time t(n), and the first estimation history PREVC corresponding to the first temperature estimation result ESTC obtained at time t(n) are used. The first temperature estimation unit 81-1 performs a process based on input signals and outputs the first temperature estimation result ESTC obtained at time t(n+1). The high-frequency component extraction unit 83-1, the coefficient adding unit 84-1, the target temperature output unit 85-1, the difference comparison unit 86-1, the control duty generation unit 87-1, and the external limiting unit 88-1 perform processes based on input signals. The external limiting unit 88-1 outputs the duty value LDC obtained at time t(n+1).

At time t(n+2), the temperature detection result TdC newly detected at time t(n+2), the duty value LDC obtained at time t(n+1), and the first estimation history PREVC corresponding to the first temperature estimation result ESTC obtained at time t(n+1) are used. The first temperature estimation unit 81-1 performs a process based on input signals and outputs the first temperature estimation result ESTC obtained at time t(n+2). The high-frequency component extraction unit 83-1, the coefficient adding unit 84-1, the target temperature output unit 85-1, the difference comparison unit 86-1, the control duty generation unit 87-1, and the external limiting unit 88-1 perform processes based on input signals. The external limiting unit 88-1 outputs the duty value LDC obtained at time t(n+2).

The time dt may be a fixed value or may be set in an initial value setting process. For example, the time dt is 100 msec.

The WAE control performed by the side control circuit 14-2 is similar to the WAE control performed by the center control circuit 14-1 described above. Therefore, descriptions of the WAE control performed by the side control circuit 14-2 are omitted here.

Next, print speed control performed by the center control circuit 14-1 is described. The print speed control is performed based on high temperature determination of the portion of the heat roller 71 not facing the print medium P.

Figure 16:
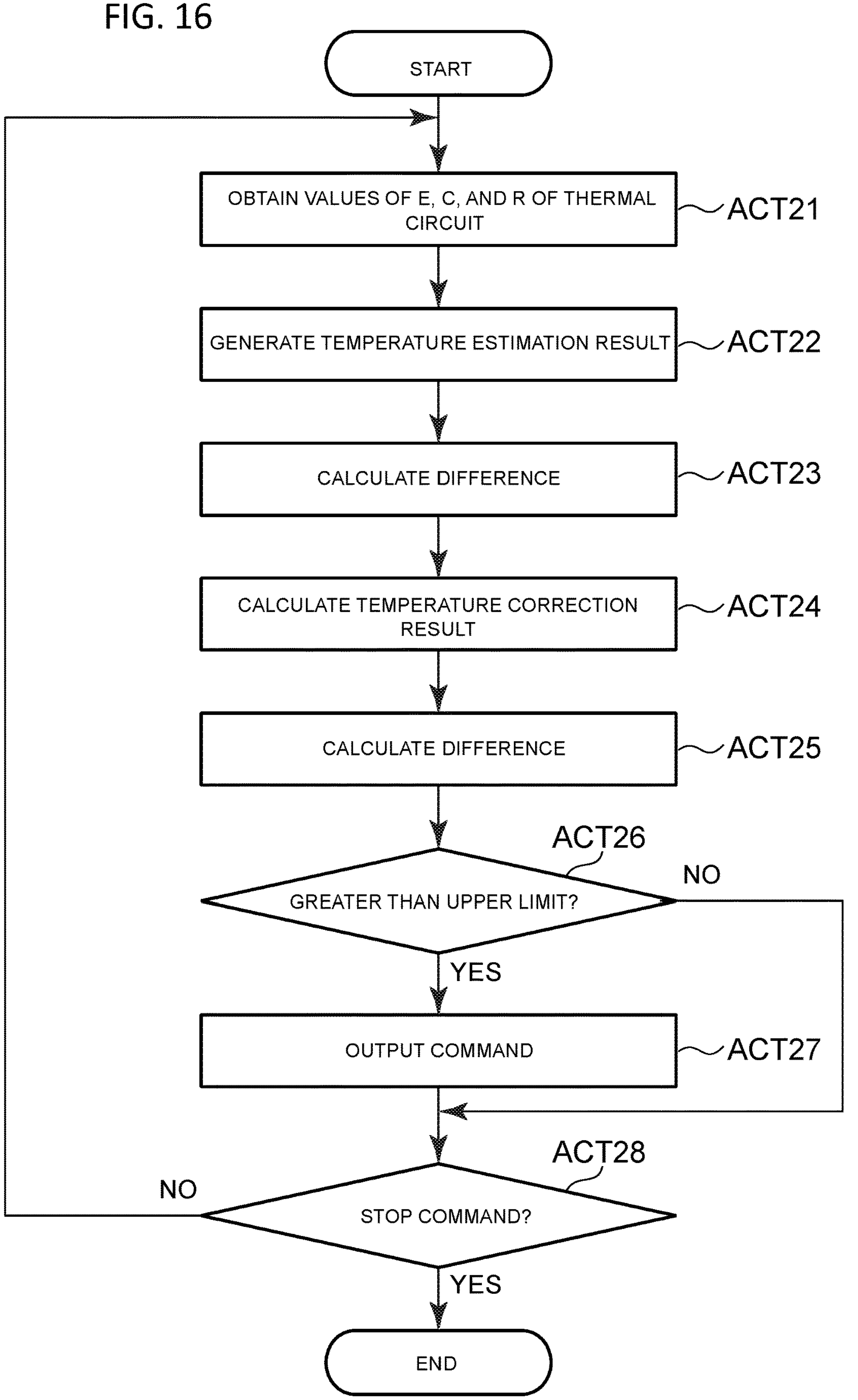
FIG. 16 is a flowchart of print speed control performed by a center control circuit according to an embodiment.

FIG. 16 is a flowchart of print speed control performed by the center control circuit 14-1 in one embodiment.

When the width of the print medium P to be used is less than the width of the portion of the heat roller 71 facing the center heater 73-1, the center control circuit 14-1 performs the print speed control. Also, the center control circuit 14-1 may perform the print speed control when the width of the print medium P to be used is less than the width of the portion of the heat roller 71 facing the center heater 73-1 and less than a predetermined width. For example, the center control circuit 14-1 may perform the print speed control when the print medium P to be used is a postcard or an envelope. When the print medium P to be used is an A4 portrait sheet, the center control circuit 14-1 does not have to perform the print speed control. When the width of the print medium P to be used is greater than or equal to the width of the portion of the heat roller 71 facing the center heater 73-1, the center control circuit 14-1 does not perform the print speed control. The processor 22 may detect the width of the print medium P to be used based on the print medium P specified by the user via the operation interface 16.

The second temperature estimation unit 91-1 obtains the values of parameters corresponding to the E, C, and R elements constituting the second thermal circuit described above (ACT 21).

The second temperature estimation unit 91-1 generates the second temperature estimation result ESTC-1 by performing a real-time simulation of the second thermal circuit (ACT 22).

The first difference calculation unit 93-1 obtains the second difference DIFC-1 based on the first temperature estimation result ESTC and the second temperature estimation result ESTC-1 (ACT 23).

The temperature correction unit 94-1 obtains the second temperature correction result WAEC-1 based on the first temperature correction result WAEC and the second difference DIFC-1 (ACT 24).

The second difference calculation unit 95-1 obtains the third difference DIFC-2 based on the second temperature correction result WAEC-1 and the maximum temperature Tmax (ACT 25).

The second difference calculation unit 95-1 determines whether the second temperature correction result WAEC-1 is greater than the maximum temperature Tmax based on the third difference DIFC-2 (ACT 26). When the second temperature correction result WAEC-1 is greater than the maximum temperature Tmax (YES in ACT 26), the process proceeds from ACT 26 to ACT 27. When the second temperature correction result WAEC-1 is less than or equal to the maximum temperature Tmax (NO in ACT26), the process proceeds from ACT 26 to ACT 28.

The second difference calculation unit 95-1 outputs the print speed adjustment command CPM to decrease the print speed from the first print speed to the second print speed (ACT 27). The second difference calculation unit 95-1 may output the print speed adjustment command CPM to adjust the print speed to a second print speed corresponding to the second temperature correction result WAEC-1 according to the variation of the second temperature correction result WAEC-1. The processor 22 adjusts the print speed based on the print speed adjustment command CPM. For example, the processor 22 adjusts the speed at which the print medium P is conveyed by the conveyance unit 19.

The center control circuit 14-1 determines whether a WAE control stop command has been received (ACT 28). When the WAE control stop command has not been received (NO in ACT 28), the center control circuit 14-1 returns from ACT 28 to ACT 21. When the WAE control stop command has been received (YES in ACT 28), the center control circuit 14-1 ends the process.

The processor 22 may also perform a process similar to that performed by the second difference calculation unit 95-1. In this case, the processor 22 obtains the second temperature correction result WAEC-1 from the temperature correction unit 94-1. The processor 22 obtains the third difference DIFC-2 based on the second temperature correction result WAEC-1 and the maximum temperature Tmax. The processor 22 adjusts the print speed based on the third difference DIFC-2.

Here, in ACT 26, there may be a case where the second temperature correction result WAEC-1 transitions from a temperature greater than the maximum temperature Tmax to a temperature less than or equal to the maximum temperature Tmax. In this case, the second difference calculation unit 95-1 may output the print speed adjustment command CPM to increase the print speed from the second print speed to the first print speed.

According to the above-described embodiments, the image forming apparatus 1 can adjust the print speed based on the second temperature estimation result ESTC-1.

With this configuration, because it is not necessary to perform low-speed printing from the start, the image forming apparatus 1 can shorten the time necessary to perform a print process. For example, when printing 100 pages, the image forming apparatus 1 can perform high-speed printing for the first 20 pages and then perform low-speed printing for the remaining 80 pages. When printing three pages, the image forming apparatus 1 can perform high-speed printing for the three pages.

According to the above-described embodiments, when the second temperature correction result WAEC-1 is greater than the maximum temperature Tmax, the image forming apparatus 1 can decrease the print speed.

With this configuration, the image forming apparatus 1 can prevent the temperature of the portion of the heat roller 71 being heated and not facing the print medium P from exceeding the maximum temperature Tmax, i.e., from becoming too high. Accordingly, for example, even when the image forming apparatus 1 performs a print process for the A4 portrait sheet after performing a print process for the postcard, the fixing of a toner image on the A4 portrait sheet is not adversely affected.

According to the above-described embodiments, the image forming apparatus 1 can obtain the second temperature correction result WAEC-1 based on the first temperature estimation result ESTC, the second temperature estimation result ESTC-1, and the first temperature correction result WAEC. The image forming apparatus 1 can adjust the print speed based on the second temperature correction result WAEC-1.

With this configuration, the image forming apparatus 1 can apply a circuit for high temperature determination of the portion of the heat roller 71 not facing the print medium P to the feedback loop of the WAE control. This in turn enables the center control circuit 14-1 to reduce the processing load for high temperature determination.

According to the above-described embodiments, the temperature detection result TdC indicates a temperature, which is detected by the temperature sensor 74-1, of the portion of the heat roller 71 facing the print medium P.

This enables the image forming apparatus 1 to obtain the second temperature correction result WAEC-1 without detecting the temperature of the portion of the heat roller 71 not facing the print medium P. This in turn eliminates the need to increase the number of temperature sensors in the image forming apparatus 1 to perform high temperature determination.

The above-described embodiments are applicable to various types of devices that use heat, e.g., a copier, a multifunction printer, or a printing machine configured to fuse toner. The embodiments are applicable to a furnace that maintains or gradually changes a temperature or a single crystal material manufacturing machine that raises crystals from a melting furnace and grows the crystals. The embodiments are applicable to a color thermal printer that changes colors depending on the temperature. The embodiments are applicable to a melting furnace for manufacturing alloys. Applying the embodiments to a copier or a color thermal printer makes it possible to perform clear printing and prevent color from changing over time even in mass printing and thereby makes it possible to improve print quality. Applying the embodiments to a melting furnace makes it possible to perform accurate temperature control and thereby makes it possible to improve the yield of products, improve the crystal quality or decrease the crystal defect rate, and improve the performance of an alloy.

The functions described in the above embodiments may be implemented not only by hardware but also by software, i.e., by loading programs implementing the functions into a computer. Also, each function may be implemented by software or hardware that is selected as appropriate.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A control device for controlling heat to be applied to a medium conveyed along a conveyance path, comprising:
- a plurality of heaters arranged along a first direction crossing the conveyance path, wherein the heaters include first and second heaters, wherein when the medium is conveyed, the first heater overlaps the medium and the second heater does not overlap the medium when viewed in a second direction crossing the conveyance path and the first direction;
- a temperature sensor; and
- a control circuit configured to:
  - determine an estimated temperature of each of the first and second heaters based on an amount of power supplied to said each of the first and second heaters,
  - determine a corrected temperature of the first heater based on the estimated temperature of the first heater and a temperature measured by the temperature sensor,
  - determine a corrected temperature of the second heater based on the estimated temperature of the second heater, the corrected temperature of the first heater, and the estimated temperature of the first heater,
  - generate energizing pulses for energizing the first and second heaters based on the corrected temperatures of the first and second heaters, and
  - issue a command for controlling a conveying speed of the medium based on the corrected temperature of the second heater.

2. The control device according to claim 1, wherein
- the control circuit is configured to determine whether the corrected temperature of the second heater is greater than a first threshold value, and
- the command instructs decreasing the conveying speed when the corrected temperature of the second heater is greater than the first threshold value.

3. The control device according to claim 2, wherein the command instructs increasing the conveying speed when the corrected temperature of the second heater is not greater than the first threshold value.

4. The control device according to claim 1, further comprising:
- a processor configured to control the conveyance speed according to the command issued by the control circuit.

5. The control device according to claim 4, wherein
- the processor is configured to determine a size of the medium,
- the control circuit is configured to determine whether the size of the medium is smaller than a predetermined size, and
- the control circuit does not issue the command when the size of the medium is not smaller than the predetermined size.

6. The control device according to claim 1, wherein the control circuit determines the estimated temperature of each of the first and second heaters further based on a previously estimated temperature thereof.

7. The control device according to claim 1, wherein the control circuit determines the estimated temperature of each of the first and second heaters based on a corresponding equivalent thermal circuit.

8. The control device according to claim 7, wherein the equivalent thermal circuit for each of the first and second heaters includes a resistor representing heat dissipation by the medium, and the resistor of the equivalent thermal circuit for the first heater has a resistance value smaller than the resistor of the equivalent thermal circuit for the second heater.

9. The control device according to claim 1, wherein the first heater is located at the center of the medium when the medium is conveyed when viewed in the second direction.

10. The control device according to claim 1, wherein the heaters are disposed inside a roller for conveying the medium.

11. An image forming apparatus comprising:

a fixing device configured to fix, by heat, an image formed on a medium conveyed along a conveyance path, the fixing device including:

a plurality of heaters arranged along a first direction crossing the conveyance path, wherein the heaters include first and second heaters, wherein when the medium is conveyed, the first heater overlaps the medium and the second heater does not overlap the medium when viewed in a second direction crossing the conveyance path and the first direction, and a temperature sensor; and a control circuit configured to:

determine an estimated temperature of each of the first and second heaters based on an amount of power supplied to said each of the first and second heaters, determine a corrected temperature of the first heater based on the estimated temperature of the first heater and a temperature measured by the temperature sensor, determine a corrected temperature of the second heater based on the estimated temperature of the second heater, the corrected temperature of the first heater, and the estimated temperature of the first heater, generate energizing pulses for energizing the first and second heaters based on the corrected temperatures of the first and second heaters, and issue a command for controlling a conveying speed of the medium based on the corrected temperature of the second heater.

12. The image forming apparatus according to claim 11, wherein the control circuit is configured to determine whether the corrected temperature of the second heater is greater than a first threshold value, and the command instructs decreasing the conveying speed when the corrected temperature of the second heater is greater than the first threshold value.

13. The image forming apparatus according to claim 12, wherein the command instructs increasing the conveying speed when the corrected temperature of the second heater is not greater than the first threshold value.

14. The image forming apparatus according to claim 11, further comprising:

a processor configured to control the conveyance speed according to the command issued by the control circuit.

15. The image forming apparatus according to claim 14, wherein the processor is configured to determine a size of the medium, the control circuit is configured to determine whether the size of the medium is smaller than a predetermined size, and the control circuit does not issue the command when the size of the medium is not smaller than the predetermined size.

16. The image forming apparatus according to claim 11, wherein the control circuit determines the estimated temperature of each of the first and second heaters further based on a previously estimated temperature thereof.

17. The image forming apparatus according to claim 11, wherein the control circuit determines the estimated temperature of each of the first and second heaters based on a corresponding equivalent thermal circuit.

18. The image forming apparatus according to claim 17, wherein the equivalent thermal circuit for each of the first and second heaters includes a resistor representing heat dissipation by the medium, and the resistor of the equivalent thermal circuit for the first heater has a resistance value smaller than the resistor of the equivalent thermal circuit for the second heater.

19. The image forming apparatus according to claim 11, wherein the first heater is located at the center of the medium when the medium is conveyed when viewed in the second direction.

20. The image forming apparatus according to claim 11, wherein the fixing device includes a roller in which the heaters are disposed.

* * * * *